US012540746B2

(12) United States Patent
Simmons et al.

(10) Patent No.: US 12,540,746 B2
(45) Date of Patent: Feb. 3, 2026

(54) SYSTEMS AND METHODS FOR DETERMINING OPERATIONAL RELATIONSHIPS IN BUILDING AUTOMATION AND CONTROL NETWORKS

(71) Applicant: Onboard Data, Inc., Somerville, MA (US)

(72) Inventors: Brian Simmons, Somerville, MA (US); Jose R. Vazquez-Canteli, Bastrop, TX (US)

(73) Assignee: Onboard Data, Inc., Somerville, MA (US)

( * ) Notice: Subject to any disclaimer, the term of this patent is extended or adjusted under 35 U.S.C. 154(b) by 421 days.

(21) Appl. No.: 18/018,376

(22) PCT Filed: Jul. 30, 2021

(86) PCT No.: PCT/US2021/044068
§ 371 (c)(1),
(2) Date: Jan. 27, 2023

(87) PCT Pub. No.: WO2022/026925
PCT Pub. Date: Feb. 3, 2022

(65) Prior Publication Data
US 2023/0304690 A1 Sep. 28, 2023

Related U.S. Application Data

(60) Provisional application No. 63/058,715, filed on Jul. 30, 2020.

(51) Int. Cl.
*F24F 11/63* (2018.01)
*F24F 11/49* (2018.01)
(52) U.S. Cl.
CPC ............. *F24F 11/63* (2018.01); *F24F 11/49* (2018.01)

(58) Field of Classification Search
CPC .. F24F 11/63; F24F 11/49; F24F 11/56; F24F 11/64; F24F 11/70; F24F 2110/10;
(Continued)

(56) References Cited

U.S. PATENT DOCUMENTS

2004/0167893 A1* 8/2004 Matsunaga ........... G06F 18/295
2009/0150324 A1* 6/2009 Dhanekula ............ G06N 20/00
702/57

(Continued)

FOREIGN PATENT DOCUMENTS

WO 2016011291 A1 1/2016
WO 2017071648 A1 5/2017

OTHER PUBLICATIONS

Extended European Search Report of the European Patent Office dated Jul. 30, 2024 for European Patent Application No. 21850983.4.

(Continued)

*Primary Examiner* — Alicia M. Choi
(74) *Attorney, Agent, or Firm* — Pierce Atwood LLP

(57) ABSTRACT

Techniques for determining point type, equipment type, equipment instance, and equipment relationship for different points associated with pieces of equipment located at a building is described. The techniques may include obtaining data corresponding to point(s) associated with one or more pieces of equipment located at a building controlled by a building control network, and using the data and statistical model(s) to determine point type(s), equipment type(s), and/or equipment instance(s) for the point(s). The techniques may include determining operational relationships between different pieces of equipment located at the building.

31 Claims, 24 Drawing Sheets

(58) Field of Classification Search
CPC .............. F24F 2110/20; F24F 2110/50; F24F 2120/10; F24F 2140/50; F24F 11/32; F24F 11/38; G05B 15/02; G05B 13/029; G05B 13/0265; G06N 20/00
See application file for complete search history.

(56) References Cited

U.S. PATENT DOCUMENTS

| | | | |
|---|---|---|---|
| 2014/0358924 A1* | 12/2014 | Seo ....................... | G06F 16/285 707/737 |
| 2016/0203036 A1* | 7/2016 | Mezic ................. | G06F 11/0751 714/819 |
| 2017/0276571 A1* | 9/2017 | Vitullo ................... | G06Q 10/06 |
| 2018/0046149 A1* | 2/2018 | Ahmed ................ | G05B 13/026 |
| 2018/0087790 A1 | 3/2018 | Perez et al. | |
| 2018/0292795 A1 | 10/2018 | Burt et al. | |
| 2018/0324199 A1* | 11/2018 | Crotinger ............ | G06F 18/2433 |
| 2019/0137131 A1* | 5/2019 | Sako ....................... | F24F 11/47 |
| 2019/0195526 A1 | 6/2019 | Drees et al. | |
| 2020/0053155 A1* | 2/2020 | Shi ......................... | G06N 5/046 |
| 2020/0090039 A1* | 3/2020 | Song ..................... | G06V 10/454 |
| 2020/0153694 A1* | 5/2020 | Savalle ............... | H04L 41/0806 |
| 2020/0162354 A1* | 5/2020 | Drees ....................... | G06N 7/01 |
| 2020/0250774 A1* | 8/2020 | Agarwal .......... | G06Q 10/06315 |
| 2020/0285203 A1* | 9/2020 | Thakur .................... | G06N 3/08 |
| 2020/0379454 A1* | 12/2020 | Trinh .................. | G05B 23/024 |

OTHER PUBLICATIONS

International Preliminary Report on Patentability and Written Opinion of the International Searching Authority, dated Jan. 31, 2023.
Invitation to Pay Additional Fees and, Where Applicable, Protest Fee mailed on Oct. 27, 2021 for International Patent Application No. PCT/US2021/044068.
International Search Report and Written Opinion mailed on Jan. 5, 2022 for International Patent Application No. PCT/US2021/044068.

* cited by examiner

SYSTEMS AND METHODS FOR DETERMINING OPERATIONAL RELATIONSHIPS IN BUILDING AUTOMATION AND CONTROL NETWORKS

CROSS-REFERENCE TO RELATED APPLICATIONS

This application is a national stage filing under 35 U.S.C. § 371 of International Patent Application Serial No. PCT/US21/044068, filed on Jul. 30, 2021, entitled "SYSTEMS AND METHODS FOR DETERMINING OPERATIONAL RELATIONSHIPS IN BUILDING AUTOMATION AND CONTROL NETWORKS," which claims priority under 35 U.S.C. § 119 (e) to U.S. Patent Application Ser. No. 63/058,715, filed Jul. 30, 2020, and entitled "SYSTEMS AND METHODS FOR DETERMINING OPERATIONAL RELATIONSHIPS IN BUILDING AUTOMATION AND CONTROL NETWORKS," the entire contents of which are incorporated by reference herein.

FEDERALLY SPONSORED RESEARCH

This invention was made with Government support under Award No. DE-SC0019958 awarded by the U.S. Department of Energy. The Government has certain rights in the invention.

FIELD

Aspects of the technology described herein relate to analyzing data obtained from building automation and control systems.

BACKGROUND

Building automation and control systems include systems that monitor, control and record functions of different building systems (e.g., heating, ventilation, and cooling systems, electricity, lighting). As part of automating and controlling these building systems, other devices including sensors, alarms, and setpoints may be associated with equipment used in operating these building systems. These devices may provide data used in controlling these building systems as well as information relating to performance of certain pieces of equipment (e.g., fans, air handling units, boiler, chiller).

SUMMARY

Some embodiments are directed to a computer-implemented method, comprising using at least one hardware processor to perform: obtaining first data for a first piece of equipment located at a building controlled by a building control network, the first data including time series data corresponding to one or more first points associated with the first piece of equipment; and determining, using the first data and at least one statistical model trained using training data indicating a plurality of point types and a plurality of equipment types for different pieces of equipment, at least one point type for the one or more first points.

In some embodiments, the method further comprises obtaining second data for a second piece of equipment located at the building, the second data including time series data corresponding to one or more second points associated with the second piece of equipment; and determining, using the second data and the at least one statistical model, at least one point type for the one or more second points and an equipment type for the second piece of equipment. In some embodiments, the at least on point type includes one or more point types selected from the group consisting of: a sensor, an actuator, a setpoint, and an alarm.

In some embodiments, the method further comprises determining, using the first data and the at least one statistical model, an equipment type for the first piece of equipment. In some embodiments, the equipment type is selected from the group consisting of: an air handling unit, a variable-air-volume box, a boiler, a chiller, a fan, a filter, and a thermostat.

In some embodiments, the at least one statistical model includes an encoder, and determining the at least one point type for the one or more first points further comprises determining, using the encoder and the first data, at least one feature of the first data. In some embodiments, determining the at least one point type for the one or more first points further comprises providing the first data as an input to the encoder and obtaining an output indicating the at least one feature.

In some embodiments, the at least one feature of the first data includes at least one selected from the group consisting of: a mean value for the first data, a median value for the first data, a standard deviation value for the first data, a kurtosis value for the first data, a skewness value for the first data, a minimum value for the first data, a maximum value for the first data, a median absolute deviation value for the first data, a mean absolute deviation value for the first data, and an interquartile range value for the first data, an autocorrelation value for the first data. In some embodiments, the first data corresponds to one point associated with the first piece of equipment, and the at least one feature of the first data includes a correlation value between the first data and second data corresponding to another point of the first piece of equipment. In some embodiments, the at least one feature of the first data includes a percentage of data values in the first data containing a decimal point. In some embodiments, the at least one feature of the first data includes a ratio of consecutive data values in the first data that are substantially similar to a total number of data values in the first data. In some embodiments, the at least one feature of the first data includes a correlation value between the time-series data of the first data and outdoor temperature for a location of the building. In some embodiments, the at least one feature of the first data includes at least one amplitude of one or more Fourier harmonics of the first data. In some embodiments, the at least one feature of the first data includes at least frequency corresponding to one or more Fourier harmonics of the first data.

In some embodiments, the at least one statistical model includes at least one classifier, and determining the at least one point type for the one or more first points further comprises determining, using the at least one classifier and the at least one feature, the at least one point type for the one or more first points. In some embodiments, determining the at least one point type for the one or more first points further comprises providing the at least one feature as an input to the at least one classifier and obtaining an output indicating the at least one point type.

In some embodiments, the output includes values corresponding to a plurality of point types, and wherein determining the at least one point type further comprises selecting, based on the values corresponding to the plurality of point types, the at least one point type for the one or more first points from among the plurality of point types. In some embodiments, the output includes values corresponding to a plurality of equipment types, and the method further comprises determining an equipment type for the first piece of equipment at least in part by selecting, based on the values corresponding to the plurality of equipment types, the equipment type for the first piece of equipment from among the plurality of equipment types.

In some embodiments, the at least one classifier comprises one or more classifiers selected from the group consisting of: a support vector machine classifier, a logistic regression classifier, a gradient boosted classifier, a decision tree classifier, a Bayesian classifier, a Bayesian network classifier, a random forest classifier, a k-nearest neighbors classifier, a neural network classifier, and an extremely randomized trees classifier.

In some embodiments, determining the at least one point type for the one or more first points further comprises providing the first data as an input to the at least statistical model and obtaining an output indicating the at least one point type as an output. In some embodiments, the at least one statistical model comprises at least one neural network. In some embodiments, the at least one neural network comprises an 1-dimensional convolutional neural network.

In some embodiments, the method further comprises performing a normalization process on the first data to obtain normalized first data, and wherein determining the at least one point type for the one or more first points further comprises providing the normalized first data as an input to the at least one neural network and obtaining an output indicating the at least one point type and the equipment type as an output. In some embodiments, the method further comprises training the at least one neural network using the training data, wherein training the at least one neural network further comprises performing layer normalization.

In some embodiments, the method further comprises applying a multidimensional transformation process to the first data to obtain transformed first data, and wherein determining the at least one point type for the one or more first points further comprises providing the transformed first data as an input to the at least one neural network and obtaining an output indicating the at least one point type as an output. In some embodiments, the transformed first data includes a multidimensional matrix. In some embodiments, the multidimensional transformation process is a geometrical transformation process. In some embodiments, the multidimensional transformation process is a probabilistic transformation process.

In some embodiments, the first data further comprises text data corresponding to the one or more first points associated with the first piece of equipment, the at least one statistical model further comprises a first statistical model and a second statistical model. The method further comprises providing the time series data as an input to the first statistical model to obtain a first output; providing the text data as an input to the second statistical model to obtain a second output; and determining, using the first output and the second output, the at least one point type for the one or more first points.

In some embodiments, the at least one statistical model further comprises a third statistical model, and determining the at least one point type for the one or more first points further comprises providing the first output and the second output as inputs to the third statistical model to obtain an output indicating the at least one point type.

Some embodiments are directed to a system comprising: at least one hardware processor; and at least one non-transitory computer-readable storage medium storing processor-executable instructions that, when executed by the at least one hardware processor, cause the at least one hardware processor to perform obtaining first data for a first piece of equipment located at a building controlled by a building control network, the first data including time series data corresponding to one or more first points associated with the first piece of equipment; and determining, using the first data and at least one statistical model trained using training data indicating a plurality of point types and a plurality of equipment types for different pieces of equipment, at least one point type for the one or more first points.

Some embodiments are directed to at least one non-transitory computer-readable storage medium storing processor-executable instructions that, when executed by at least one hardware processor, cause the at least one hardware processor to perform obtaining first data for a first piece of equipment located at a building controlled by a building control network, the first data including time series data corresponding to one or more first points associated with the first piece of equipment; and determining, using the first data and at least one statistical model trained using training data indicating a plurality of point types and a plurality of equipment types for different pieces of equipment, at least one point type for the one or more first points.

Some embodiments are directed to a computer-implemented method, comprising using at least one hardware processor to perform: obtaining data from a plurality of points in a building control network for a building, the data including structured data and unstructured data; and determining, using the data and at least one statistical model, a plurality of equipment instances for the plurality of points, wherein each of the plurality of equipment instances identifies an equipment node for a group of points in the building control network.

In some embodiments, determining the plurality of equipment instances further comprises using text identified from the data as input to the at least one statistical model. In some embodiments, the data includes text values for attributes of individual points in the building control network, and wherein determining the plurality of equipment instances comprises using text extracted from the text values as input to the at least one statistical model.

In some embodiments, the method further comprises extracting text values from an attribute for a point in the building control network; removing punctuation in the text values to generate filtered text; and using the filtered text as input to the at least one statistical model. In some embodiments, the method further comprises identifying an acronym in the text values for the attributes; determining, using a natural language dictionary, a word corresponding to the acronym; and replacing the acronym in the text values with the word.

In some embodiments, the data includes a plurality of rows corresponding to individual points in the building control network, and wherein determining the plurality of equipment instances comprises using row information as input to the at least one statistical model. In some embodiments, the row information includes row numbers associated with points, and wherein determining the plurality of equipment instances comprises using the row numbers as input to the at least one statistical model.

In some embodiments, the at least one statistical model comprises a clustering-based classifier. In some embodiments, a group of points determined for one of the plurality of equipment instances includes points in the building control network having different point types. In some embodiments, the different point types include two or more selected from the group consisting of: a sensor, an actuator, a setpoint, and an alarm.

Some embodiments are directed to a system comprising at least one hardware processor and at least one non-transitory computer-readable storage medium storing processor-executable instructions that, when executed by the at least one hardware processor, cause the at least one hardware processor to perform obtaining first data for a first piece of equipment located at a building controlled by a building control network, the first data including time series data corresponding to one or more first points associated with the first piece of equipment; and determining, using the first data and at least one statistical model trained using training data indicating a plurality of point types and a plurality of equipment types for different pieces of equipment, at least one point type for the one or more first points.

Some embodiments are directed to at least one non-transitory computer-readable storage medium storing processor-executable instructions that, when executed by at least one hardware processor, cause the at least one hardware processor to perform obtaining first data for a first piece of equipment located at a building controlled by a building control network, the first data including time series data corresponding to one or more first points associated with the first piece of equipment; and determining, using the first data and at least one statistical model trained using training data indicating a plurality of point types and a plurality of equipment types for different pieces of equipment, at least one point type for the one or more first points.

Some embodiments are directed to a computer-implemented method comprising using at least one hardware processor to perform: obtaining first data from a building control network associated with a first piece of equipment in a building, the first data including time series data corresponding to different points associated with the first piece of equipment; obtaining second data from the building control network associated with a second piece of equipment in the building, the second data including time series data corresponding to different points associated with the second piece of equipment; and determining, using the first data, the second data, and at least one trained statistical model, an operational relationship between the first piece of equipment and the second piece of equipment.

In some embodiments, the first piece of equipment is an air handling unit and the second piece of equipment is a variable-air-volume box. In some embodiments, the first data corresponds to a supply fan speed and the second data corresponds to discharge air flow. In some embodiments, the first data corresponds to discharge air temperature of the air handling unit and the second data corresponds to discharge air temperature of the variable-air-volume box.

In some embodiments, the method further comprises: selecting, based on a type of the first piece of equipment, a portion of the first data for a first point associated with the first piece of equipment having a first point type; selecting, based on a type of the second piece of equipment, a portion of the second data for a second point associated with the second piece of equipment having a second point type; and determining, using the portion of the first data, the portion of the second data, and the at least one trained statistical model, the operational relationship between the first piece of equipment and the second piece of equipment.

In some embodiments, the method further comprises performing a correlation process on the portion of the first data and the portion of the second data and using an output of the correlation process as input to the at least one trained statistical model. In some embodiments, the correlation process is a cross-correlation process, and an output of the cross-correlation process is used as input to the at least one trained statistical model. In some embodiments, the output of the cross-correlation process is a time associated with a cross-correlation value. In some embodiments, the method further comprises: determining statistical values for at least one time window in the portion of the first data and the portion of the second data; and using a combination of one or more statistical values for the portion of the first data and one or more statistical values for the portion of the second data as input to the at least one trained statistical model.

In some embodiments, the one or more statistical values for the portion of the first data are selected from the group consisting of: a minimum value, a maximum value, a mean value, a median value, a standard deviation value, $5^{th}$ percentile value, $25^{th}$ percentile value, $33^{rd}$ percentile value, $66^{th}$ percentile value, $75^{th}$ percentile value, and $95^{th}$ percentile value. In some embodiments, the at least one time window is selected based on diurnal occupancy patterns in the building.

In some embodiments, the method further comprises determining a difference between the one or more statistical values for the portion of the first data and the one or more statistical values for the portion of the second data, and using the difference as input to the at least one trained statistical model.

In some embodiments, the at least one trained statistical model comprises at least one classifier selected from the group consisting of: a support vector machine classifier, a logistic regression classifier, a gradient boosted classifier, a decision tree classifier, a Bayesian classifier, a network Bayesian classifier, a neural network classifier, and a random forest classifier. In some embodiments, the at least one trained statistical model includes at least one neural network.

Some embodiments are directed to a system comprising at least one hardware processor and at least one non-transitory computer-readable storage medium storing processor-executable instructions that, when executed by the at least one hardware processor, cause the at least one hardware processor to perform obtaining first data from a building control network associated with a first piece of equipment in a building, the first data including time series data corresponding to different points associated with the first piece of equipment; obtaining second data from the building control network associated with a second piece of equipment in the building, the second data including time series data corresponding to different points associated with the second piece of equipment; and determining, using the first data, the second data, and at least one trained statistical model, an operational relationship between the first piece of equipment and the second piece of equipment.

Some embodiments are directed to at least one non-transitory computer-readable storage medium storing processor-executable instructions that, when executed by at least one hardware processor, cause the at least one hardware processor to perform obtaining first data from a building control network associated with a first piece of equipment in a building, the first data including time series data corresponding to different points associated with the first piece of equipment; obtaining second data from the building control network associated with a second piece of equipment in the building, the second data including time series data corresponding to different points associated with the second piece of equipment; and determining, using the first data, the second data, and at least one trained statistical model, an operational relationship between the first piece of equipment and the second piece of equipment.

Some embodiments are directed to computer-implemented method, comprising using at least one hardware processor to perform: obtaining data from at least one building control network controlling a plurality of buildings, the data including a first set of data obtained from a building control network for a first building of the plurality of buildings and a second set of data obtained from a building control network for a second building of the plurality of buildings; determine, using the first set of data and at least one statistical, at least one first parameter value for the at least one statistical model; determine, using the second set of data and the at least one statistical model, at least one second parameter value for the at least one statistical model; determining at least one third parameter value for the at least one statistical model based on the at least one first parameter value and the at least one second parameter value; and outputting at least one trained statistical model having the at least one third parameter value.

In some embodiments, the method further comprises determining, using the at least one third parameter value and the at least one trained statistical model, at least one label for a third set of data obtained from a building control network controlling a third building.

In some embodiments, the at least one trained statistical model includes a first statistical model and a second statistical model, and wherein determining the at least one label for the third set of data comprises determining a point type using the first statistical model and determining an equipment type using the second statistical model.

In some embodiments, the at least one label includes a point type. In some embodiments, the point type comprises a point type selected from the group consisting of a sensor, an actuator, a setpoint, and an alarm. In some embodiments, the at least one label includes an equipment type. In some embodiments, the equipment type comprises an equipment type selected from the group consisting of: an air handling unit, a variable-air-volume box, a boiler, a chiller, a fan, a filter, and a thermostat. In some embodiments, the at least one label includes a first label identifying a point type for a point in the building control network and a second label identifying an equipment type for the point in the building control network.

In some embodiments, the at least one trained statistical model comprises at least one classifier selected from the group consisting of a support vector machine classifier, a logistic regression classifier, a gradient boosted classifier, a decision tree classifier, a Bayesian classifier, a Bayesian network classifier, and a random forest classifier. In some embodiments, the at least one trained statistical model includes at least one neural network.

In some embodiments, the method further comprises training the at least one statistical model using at least one feature determined from a natural language dictionary of building control network terms to obtain the at least one trained statistical model. In some embodiments, the building control network terms are associated with different suppliers of equipment.

Some embodiments are directed to a system comprising at least one hardware processor and at least one non-transitory computer-readable storage medium storing processor-executable instructions that, when executed by the at least one hardware processor, cause the at least one hardware processor to perform obtaining data from at least one building control network controlling a plurality of buildings, the data including a first set of data obtained from a building control network for a first building of the plurality of buildings and a second set of data obtained from a building control network for a second building of the plurality of buildings; determine, using the first set of data and at least one statistical, at least one first parameter value for the at least one statistical model; determine, using the second set of data and the at least one statistical model, at least one second parameter value for the at least one statistical model; determining at least one third parameter value for the at least one statistical model based on the at least one first parameter value and the at least one second parameter value; and outputting at least one trained statistical model having the at least one third parameter value.

Some embodiments are directed to at least one non-transitory computer-readable storage medium storing processor-executable instructions that, when executed by at least one hardware processor, cause the at least one hardware processor to perform obtaining data from at least one building control network controlling a plurality of buildings, the data including a first set of data obtained from a building control network for a first building of the plurality of buildings and a second set of data obtained from a building control network for a second building of the plurality of buildings; determine, using the first set of data and at least one statistical, at least one first parameter value for the at least one statistical model; determine, using the second set of data and the at least one statistical model, at least one second parameter value for the at least one statistical model; determining at least one third parameter value for the at least one statistical model based on the at least one first parameter value and the at least one second parameter value; and outputting at least one trained statistical model having the at least one third parameter value.

Some embodiments are directed to a computer-implemented method, comprising using at least one hardware processor to perform: extracting, from unstructured data sources, terminology associated with building control networks, wherein the unstructured data sources include data sources from different suppliers of building automation equipment; and constructing a natural language dictionary using the extracted terminology, wherein the natural language dictionary relates terms for different types of building automation equipment to shorthand versions of the terms.

In some embodiments, the unstructured data sources include webpages associated with one or more of the different suppliers. In some embodiments, extracting the terminology further comprises using a web scraping process. In some embodiments, the shorthand versions of the terms include one or more acronyms. In some embodiments, the method further comprises determining two or more acronyms associated with a first term.

In some embodiments, the method further comprises: determining at least one feature of the terms included in the natural language dictionary; and using the at least one feature to train at least one statistical model. In some embodiments, determining the at least one feature of the terms further comprises determining one or more term frequency-inverse document frequency values associated with individual terms in the natural language dictionary.

In some embodiments, the at least one statistical model comprises at least one classifier selected from the group consisting of: a support vector machine classifier, a logistic regression classifier, a gradient boosted classifier, a decision tree classifier, a Bayesian classifier, a Bayesian network classifier, and a random forest classifier. In some embodiments, the at least one trained statistical model includes at least one neural network.

In some embodiments, the method further comprises determining, using the at least one statistical model, at least one label for data obtained from a building control network. In some embodiments, the at least one statistical model comprises a first statistical model and a second statistical model, and wherein determining the at least one label further comprises determining a point type using the first statistical model and determining an equipment type using the second statistical model.

Some embodiments are directed to a system comprising at least one hardware processor and at least one non-transitory computer-readable storage medium storing processor-executable instructions that, when executed by the at least one hardware processor, cause the at least one hardware processor to perform extracting, from unstructured data sources, terminology associated with building control networks, wherein the unstructured data sources include data sources from different suppliers of building automation equipment; and constructing a natural language dictionary using the extracted terminology, wherein the natural language dictionary relates terms for different types of building automation equipment to shorthand versions of the terms.

Some embodiments are directed to at least one non-transitory computer-readable storage medium storing processor-executable instructions that, when executed by at least one hardware processor, cause the at least one hardware processor to perform extracting, from unstructured data sources, terminology associated with building control networks, wherein the unstructured data sources include data sources from different suppliers of building automation equipment; and constructing a natural language dictionary using the extracted terminology, wherein the natural language dictionary relates terms for different types of building automation equipment to shorthand versions of the terms.

BRIEF DESCRIPTION OF DRAWINGS

Various aspects and embodiments will be described with reference to the following figures. The figures are not necessarily drawn to scale.

DETAILED DESCRIPTION

Figure 1:
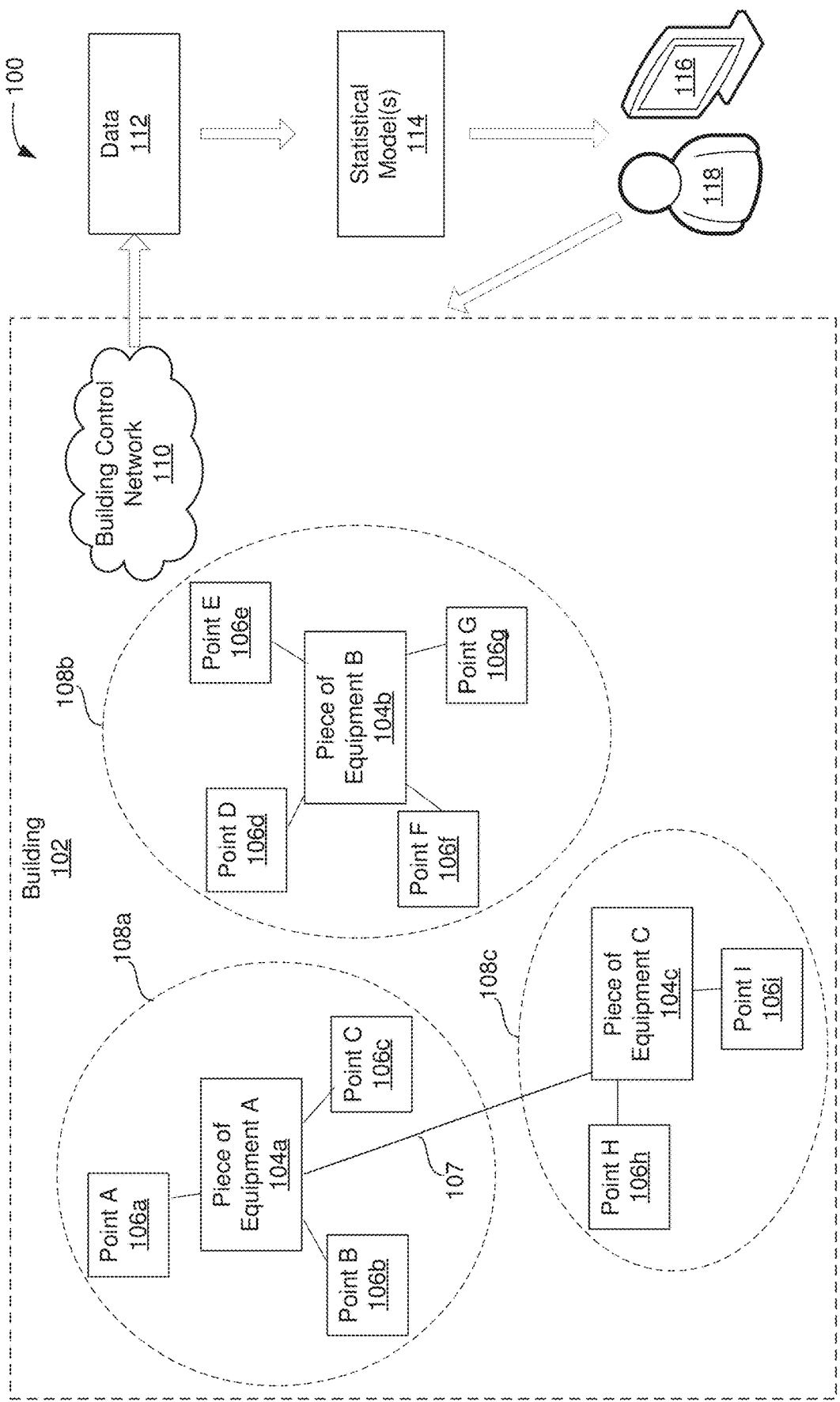
FIG. 1 is a diagram of an illustrative process for obtaining data from a building control network controlling a building to identify label(s) for measurement point(s) and piece(s) of equipment located at the building using the computational techniques described herein.

Aspects of the present application relate to techniques for analyzing data obtained from building automation and control networks. The data may be obtained from electronic devices designed to monitor and control the mechanical, security, fire, flood safety, lighting, heating, ventilation, and air conditioning (HVAC), humidity control, ventilation systems, elevators, and other systems in a building. This includes data from the equipment, systems, and controllers such as programmable logic controllers, system/network controllers, terminal unit controllers and others, which can be analog or digital. These devices, the collective system of devices, and any associated software may be referred to as a building automation and control network, which may also be referred to herein as a building control network. In some instances, a building automation and control network may include one or more communication protocols, such as BACnet and Modbus. The techniques described herein may be applied to various types of buildings, including residential buildings, commercial buildings, and industrial buildings, and may be used to determine operational relationships between devices, including instances where devices are not physically connected to each other. In some embodiments, analysis of the data obtained from devices in a building automation and control network occurs in real-time, which may be used in determining future operation and management. In some embodiments, analysis of the data obtained from devices in a building automation and control network involves analysis of historical data.

Data may be obtained from measurement points (also referred to herein as "points") in a building automation and control network, including points associated with equipment in the building. Examples of point types include sensors, actuators, setpoints, and alarms. Examples of types of equipment include air handling units, variable-air-volume boxes, boilers, chillers, fans, filters, and thermostats. A single piece of equipment may be associated with many measurement points, including different types of measurement points. For example, a variable-air-volume box may be associated with several points, including an air flow sensor, a temperature sensor, and a setpoint. The data may include time series data having a series of data values at different times for different points associated with equipment in the building. The data may include text data, which may include both structured and unstructured data. For example, structured text data may include text values for different data fields in a relational database. Unstructured text data may include text values that lack an organized storage format. For example, text data stored in files, documents, websites, and sensor data may include unstructured text data. The format of the data outputted from points associated with a building may vary among different equipment suppliers, including variation in the structured text fields and unstructured text descriptions used in the output data. This can lead to challenges in developing techniques that can be implemented across different buildings having equipment from more than one supplier.

Aspects of the present application relate to techniques for analyzing data obtained from points to group the points into "equipment instances" or "equipment nodes" corresponding to particular pieces of equipment. In some instances, these techniques involve identifying labels for individual points of a building automation and control network based on the data obtained from the points. An example of a label is a point type label, which identifies the type of data obtained from a particular point (e.g., temperature measurements, air flow measurements, setpoint values). Another example of a label is an equipment type label, which identifies the type of equipment (e.g., air handling units, variable-air-volume boxes, boilers, chillers) associated with a particular point. A third example of a label is an equipment instance label, which identifies the equipment instance the point belongs to. Other types of labels may also be used and embodiments are not limited in this respect. A group of points having the same equipment instance label may indicate that those points are associated with the same piece of equipment. In some embodiments, labels are used to determine operational relationships between different pieces of equipment of the building by analyzing the data labeled as belonging to different equipment instances.

The inventors have recognized that real estate is the world's largest asset class, but has been relatively underserved by technology in developing improvements for operation and management of buildings. For example, the median age of most commercial buildings in the U.S. is more than thirty years old, and energy efficiency considerations are largely absent from their design and operations. In addition, buildings account for 30% of global energy consumption and 28% of global energy-related $CO_2$ emissions. Conventional techniques for building control software may reduce unnecessary energy usage and generate individual building and portfolio energy savings of up to 47% and 33%, respectively. However, deployment of these technologies is slow, expensive and often inaccurate, which leads to poor return-on-investment and market adoption. Typically, trained personnel are required to translate, or manually map, existing metadata from building automation systems to deploy conventional software tools. This often involves reconciling different data formats among different pieces of equipment, including equipment from different suppliers. For example, it may take days or weeks (e.g., over 800 hours) for a building expert to map metadata for a single software application on an average commercial building. This mapping process performed by the building expert is insufficient to support building energy management goals for real estate owners, operators, utilities, and software vendors.

The inventors have recognized the need for techniques that can be used for analyzing data obtained from building control networks across different buildings, including different types of buildings, different types of equipment deployed at those buildings, and equipment from different suppliers. Such techniques would ease analysis of data obtained from building control networks across different buildings, which is one of the limitations of conventional building control software. The techniques described herein may reduce or eliminate many of the market bottlenecks in deploying and controlling building management systems to meet energy efficiency goals, thus increasing opportunities to improve energy and operational efficiencies, and, ultimately, reduce the negative impact of buildings on our climate. In addition, the techniques described herein may reduce the level of human effort, time, expense, and inaccuracies to deploy advanced software for building management and control systems. For example, understanding operational relationships between two or more pieces of equipment may allow for improved understanding of the functioning and performance of a building's systems. Conventional techniques for determining operational relationships involve having a building expert examining mechanical drawings and HVAC diagrams to determine the flow of equipment relationships. This analysis is often costly, both in terms of time and expenses in having the building expert perform this analysis.

To address some of the difficulties that arise with conventional techniques for analyzing data obtained from building management and control systems, the inventors have developed improved techniques for analyzing data obtained from building control networks that are independent of the type of building and types of equipment deployed at the buildings. For example, the inventors have developed machine learning techniques that can predict labels that are important for deploying advanced software. In particular, these machine learning techniques may accurately predict equipment type, point type, equipment instance, and equipment relationship at a high level of accuracy (e.g., greater than 75%). For example, in some embodiments, these machine learning techniques may accurately predict equipment type, point type, equipment instance, and equipment relationship at accuracies of at least 83%, 84%, 78%, and 79%, respectively.

Some embodiments involve obtaining data from a building control network used for controlling equipment in a building where the data corresponds to point(s) associated with piece(s) of equipment located at the building and determining label(s) for the point(s) using the data and statistical model(s). The statistical model(s) may be trained using training data indicating point types and equipment types for different pieces of equipment, which may include equipment from different suppliers. In some embodiments, the training data may include data obtained from multiple different buildings, which may include different types of buildings, including commercial, industrial, and residential buildings. The label(s) determined for the point(s) may include point type(s), equipment type(s), equipment instance(s), and equipment relationship(s).

In some embodiments, the data may include time series data corresponding to point(s) associated with piece(s) of equipment. Determining the label(s) may involve providing the data as an input to the statistical model(s) to obtain an output indicating the label(s). In some embodiments, determining the label(s) involves determining a point type for one or more of the point(s). For example, the output of the statistical model(s) may represent a likelihood that a particular point is categorized as a particular point type (e.g., a sensor, a setpoint, an alarm, an actuator). Using such an output, the point may be labeled as having the particular point type. In some embodiments, determining the label(s) involves determining an equipment type for one or more of the points. As an example, the output of the statistical model(s) may include a prediction indicating that a particular point as being categorized as a particular equipment type (e.g., a fan, a chiller, an air handling unit), and based on the output, the point may be labeled as having the particular equipment type.

In some embodiments, the statistical model(s) may include an encoder and classifier(s). Time series data obtained from a building control network may be provided as an input to the encoder to obtain data feature(s). The data feature(s) may include statistical values for the time series data, including mean, median, standard deviation, minimum, etc. The data feature(s) may include a feature relating to a particular format of the time series data. One type of feature is a "time-based ratio" of consecutive data values that are constant to the total number of data values, which may be used to distinguish between points having values that change frequently versus points that have periods of time during which their values are relatively constant. For example, the time-based ratio may be used in distinguishing between data originating from a set point controller versus data originating from a sensor device. A set point controller is a device or system of devices used to maintain a desired value or target value for one or more processes in a system. A sensor device may measure an actual value in the system. In the context of a building, one example of a set point controller is a temperature controller used provide a desired temperature for the building, and an example of a sensor device is a temperature sensor. When data from the temperature sensor falls below or above the desired temperature, the temperature controller may provide control signals to one or more pieces of equipment used for controlling the temperature of the building. For example, if the actual temperature falls below the desired temperature, then the temperature controller may provide control signals to a broiler to turn on.

Likewise, if the actual temperature is above the desired temperature, then the temperature controller may provide control signals to an air chiller to turn on. As the temperature controller is likely to hold a constant value, such as a desired temperature set point, for a prolonged period of time, a time-based ratio for the temperature controller is likely to have a higher value. In contrast, a sensor is more likely to have values that fluctuate, resulting in the time-based ratio having a lower value. In this way, the time-based ratio may be used in distinguishing between data originating from a set point controller versus a sensor device.

The data feature(s) may be provided as an input to the classifier(s) to obtain an output indicating label(s) for the point(s). Examples of classifier(s) include a support vector machine classifier, a logistic regression classifier, a gradient boosted classifier, a decision tree classifier, a Bayesian classifier, a Bayesian network classifier, a random forest classifier, a k-nearest neighbors classifier, a neural network classifier, and an extremely randomized trees classifier.

In some embodiments, the statistical model(s) include a neural network (e.g., a convolutional neural network). Time series data may be preprocessed and the preprocessed data may be provided as an input to the neural network. An example of preprocessing the time series data involves applying a transformation process to the time series data to obtain transformed time series data (e.g., multidimensional matrix) and providing the transformed time series data into the neural network to obtain an output indicating label(s). In some embodiments, the transformation process is a geometrical transformation process. In some embodiments, the transformation process is a probabilistic transformation process.

In some embodiments, the data obtained from a building control network includes text data corresponding to point(s) associated with piece(s) of equipment located at a building controlled by the building control network. The text data may include structured data and unstructured data. For example, data obtained from a building control network may have a structured format with rows corresponding to individual point(s) and columns corresponding to different attributes, whereas the text values for the attributes may be unstructured. Some embodiments use the text data and statistical model(s) to determine label(s) for the point(s).

An attribute in the structured format of the text data may provide an indication of whether a group of points are associated with the same piece of equipment. In such instances, points in that group may be labeled with the same equipment instance. For example, points that share a common network device in the building control network may have the same or similar name for the attribute that names the common network device. In this way, the text values for the attribute naming a network device for different points may be used in determining equipment instance labels for the different points. In addition, the organization of different rows in the structured format of the text data may provide an indication of whether points may be grouped together as an equipment instance. For example, points having consecutive row numbers may be more likely to have the same equipment instance. Accordingly, some embodiments involve using the text data and features of the structured format as inputs to the statistical model(s) for determining equipment instance(s) for point(s).

Some embodiments involve determining operational relationships between different pieces of equipment. An operational relationship may relate relative positioning of two or more pieces of equipment in the context of operating a building. In some embodiments, determining an operational relationship may involve determining that relative positioning of two or more pieces of equipment in a flow pattern within a building. For example, a typical building may have 10 or less air handling units and often greater than 100 variable-air-volume boxes. The techniques described herein may be applied to determine the operational relationships between these air handling units and variable-air-volume boxes. One type of operational relationship may include determining that one of the air handling units feeds air downstream to a variable-air-volume box that delivers air to a room in the building. In some embodiments, determining an operational relationship may involve determining that a first piece of equipment is component of a second piece of equipment. The first piece of equipment may be contained within the second piece of equipment and/or used in operating the second piece of equipment. For example, determining an operational relationship between a supply fan and an air-handling unit may involve determining that the supply fan is contained within the air-handling unit. As another example, determining an operational relationship between a pump and a water chiller may involve determining that the pump is used to circulate water within the water chiller.

In some embodiments, time series data associated with points in different equipment instances may be used in determining an operational relationship between pieces of equipment associated with these different equipment instances. Determining an operational relationship may involve obtaining first time series data associated with a first piece of equipment and second time series data associated with a second piece of equipment. The first time series data and the second time series data may correspond to different points associated with the first piece of equipment and the second piece of equipment, respectively. The first data, the second data, and a statistical model may be used to determine an operational relationship between the first piece of equipment and the second piece of equipment. As an example, supply fan speed data obtained from a sensor associated with an air handling unit and discharge air flow data obtained from a sensor associated with a variable-air-volume box may be used in determining an operational relationship between the air handling unit and the variable-air-volume box. In particular, the supply fan speed data and the discharge air flow data may be provided as inputs to a statistical model to obtain an output indicating the operational relationship.

Some embodiments may involve using diurnal occupancy patterns to determine one or more statistical values for a time window corresponding to daytime and a time window corresponding to nighttime for time series data obtained from points associated with two or more pieces of equipment. The one or more statistical values may be provided as input to the statistical model to obtain an output indicating an operational relationship between the two or more pieces of equipment. Examples of statistical values that may be determined for a time window of time series data include a minimum value, a maximum value, a mean value, a median value, a standard deviation value, $5^{th}$ percentile value, $25^{th}$ percentile value, $33^{rd}$ percentile value, $66^{th}$ percentile value, $75^{th}$ percentile value, and $95^{th}$ percentile value.

In some embodiments, a correlation process may be performed on some or all of the first data and the second data, and an output of the correlation process may be provided as input to the statistical model. For example, a cross-correlation process may be performed between the first data and the second data and an output of the cross-correlation process may include a time associated with a cross-correlation value, which may be provided as an input to the statistical model.

It should be appreciated that the various aspects and embodiments described herein be used individually, all together, or in any combination of two or more, as the technology described herein is not limited in this respect.

FIG. 1 is a diagram of an illustrative process 100 for analyzing data obtained from a building control network controlling a building to identify label(s) for measurement point(s) and piece(s) of equipment located at the building using the computational techniques described herein. Process 100 may be performed on any suitable computing device(s) (e.g., a single computing device, multiple computing device(s) co-located in a single physical location or located in multiple physical locations remote from one another, one or more computing devices part of a cloud computing system, etc.) as aspects of the technology described herein are not limited in this respect. In some embodiments, process 100 may be performed by a desktop computer, a laptop computer, or a mobile computing device. In some embodiments, process 100 may be performed within one or more computing devices that are part of a cloud computing environment.

As shown in FIG. 1, building 102 includes piece of equipment A 104a, piece of equipment B 104b, and piece of equipment C 104c that are part of one or more building systems (e.g., heating, ventilation, and air conditioning (HVAC), humidity control, lighting) of building 102. Examples of types of pieces of equipment include air handling units, variable-air-volume boxes, boilers, chillers, fans, filters, and thermostats. Although only three pieces of equipment are shown in FIG. 1, it should be appreciated that more or fewer pieces of equipment may be included as part of a building system.

One or more measurements points (also referred to herein as "points") may be associated with individual pieces of equipment. For example, FIG. 1 shows piece of equipment A 104a associated with point A 106a, point B 106b, and point C 106c. As another example, piece of equipment B 104b is associated with point D 106d, point E 106e, point F 106f, and point G 106g. As yet another example, piece of equipment C 104c is associated with point H 106h and point I 106i. Examples of types of points include an air flow sensor, a temperature sensor, an actuator, a setpoint, an alarm, a motion detector.

A group of points associated with a particular piece of equipment may refer to an "equipment instance." FIG. 1 shows equipment instances 108a, 108b, and 108c in the dashed circles and associated with piece of equipment A 104a, piece of equipment B 104b, and piece of equipment C 104c, respectively. Equipment instance 108a includes point A 106a, point B 106b, and point C 106C. Equipment instance 108b includes point D 106d, point E 106e, point F 106f, and point G 106g. Equipment instance 108c includes point H 106h and point I 106i. For example, piece of equipment A 104a may be a variable-air-volume box, point A 106a may be an air flow sensor, point B 106b may be a temperature sensor, and point C 106c may be a setpoint.

Building control network 110 associated with building 102 may provide communication services between control systems and devices of building 102, including piece of equipment A 104a, piece of equipment B 104b, and piece of equipment C 104c and point A 106a, point B 106b, point C 106c, point D 106d, point E 106e, point F 106f, point G 106g, point H 106h, and point I 106i. Building control network 110 may be configured to implement one or more communication protocols (e.g., BACnet, Modbus). Building control network 110 may provide the capability to control and monitor building automation process(es) of building 102. For example, building 102 may include a HVAC system, and building control network 110 may control of pieces of equipment of building 102 that provide heating, cooling, and ventilation for building 102. In addition, building control network 110 may receive data from motion detector(s) of building 102 which may be used to detect human presence and activity, which may be used in controlling the pieces of equipment of building 102 that provide heating, cooling, and ventilation for building 102.

As shown in FIG. 1, data 112 obtained from building control network 110 may be analyzed using statistical model 114. Information generated as a result of the analysis may be output to computing device 116, which may be presented to user 118. In some embodiments, an operational relationship between two or more pieces of equipment may be identified using the techniques described herein. FIG. 1 shows an operational relationship 107 existing between piece of equipment A 104a and piece of equipment C 104c illustrated. For example, an operational relationship between an air handling unit and a variable-air-volume box, where the air handling unit is downstream of the variable-air-volume box may be identified using statistical model(s) 112. If either the air handling unit or the variable-air-volume box has reduced performance, then the air handling unit and/or the variable-air-volume box may be identified as being in need of service. In this way, label(s) determined using data 112 and statistical model(s) may then be used to identify piece(s) of equipment in need of service. Examples of failures that may require service include cooling or heating valve failure in an air handling unit, cooling coil in an air handling unit is fouled and cannot maintain specified heat transfer, supply air filter is dirty or blocked. In addition, label(s) determined using data 112 and statistical model(s) may then be used to identify piece(s) of equipment that are likely to fail or running inefficiently. As an example, a variable-air-volume box may be identified as being inoperative by determining an operational relationship between the variable-air-volume box and an air handling unit and detecting from measurements obtained from points associated with both the variable-air-volume box and the air handling unit that supply fan speed and discharge air flow associated with the air handling unit has increased and discharge air flow associated with the variable-air-volume box remains the same or similar. In some embodiments, information generated as a result of process 100 may be used in predicting when a piece of equipment is likely to need service in the future. In such embodiments, historical sensor data obtained by monitoring equipment in a building may be used in predicting future occurrences of faults and failures for pieces of equipment in the building.

In some embodiments, information generated as a result of process 100 may be used in monitoring $CO_2$ concentration in a building. Process 100 may be used in determining one or more of the points in the building as being a $CO_2$ sensor. $CO_2$ measurements may be binned according as being a particular level, such as a low level, a medium level, and a high level, within a duration of time (e.g., 12 hours, 24 hours). Monitoring $CO_2$ concentration in a building may allow for detecting an error with another piece of equipment that may impact air quality in the building. For example, monitoring $CO_2$ concentration may include determining that the building has a high level of $CO_2$, which may indicate that an outdoor air damper is ineffective in letting in enough fresh air into the building.

In some embodiments, information generated as a result of process 100 may be used in detecting an error with an outdoor air sensor. Process 100 may be used in determining one or more of the points for a building as being an outdoor air sensor. Temperature measurements obtained from the outdoor air sensor may be compared to a third-party weather data to determine whether the outdoor air sensor is accurately measuring temperature. If temperature measurements obtained from the outdoor air sensor and the third-party weather data are not the same or similar, then further action may involve calibrating the outdoor air sensor or replacing the outdoor air sensor.

In some embodiments, information generated as a result of process 100 may be used in monitoring occupancy for a building, including occupancy for different rooms within the building. Process 100 may be used in determining one or more of the points for a building as being a motion sensor. Data from the motion sensor may be analyzed over time to monitor building occupancy. Labeling of specific points in the building may allow owners and operators of the building to track real-time capacity and location throughout the building. In some embodiments, tracking occupancy in a building may be used in operating devices (e.g., turnstiles) located at access points of the building and/or managing security personnel at access points.

In some embodiments, information generated as a result of process 100 may be used in monitoring indoor air quality. Process 100 may be used in determining one or more of the points for a building as being air flow sensors, humidity sensors, temperature sensors, and other HVAC sensors. Data from these sensors may be used in monitoring indoor air quality for the building (e.g., hospital, school, lab, office space). Air quality may include high $CO_2$ level and/or presence of bacteria, virus, mites, or fungi. Monitoring indoor air quality may include determining that indoor air quality is below a threshold level and notifying an owner or occupant of the building that the indoor air quality is poor.

In some embodiments, information generated as a result of process 100 may be used in predicting energy consumption for a building. Data from points in the building may be used in determining prior energy consumption for the building, which may be used in predicting future energy consumption for the building. Predicting future energy consumption may involve identifying when to shift thermal loads for a HVAC system of the building. For example, generating ice during off-peak energy consumption hours that is used to cool the building during the hottest part of the day may reduce energy costs.

In some embodiments, information generated as a result of process 100 may be used in monitoring indoor air temperature. Process 100 may be used in determining one or more of the points for a building as being temperature sensors, other HVAC sensors, and outdoor temperature sensors. Data from these sensors may be used in monitoring indoor air temperature for the building, which can impact thermal comfort for the building's occupants. Monitoring indoor air temperature may include determining if the building or a room in the building is above a threshold temperature on a hot day or below a threshold temperature on a cold day and notifying an owner or occupant of the building a status of thermal conditions for the building.

In some embodiments, information generated as a result of process 100 may be used in adjusting temperature set points for the building. Process 100 may be used in determining one or more of the points for a building as being temperature set points. These temperature set points may be adjusted based on an indication identifying a change in energy rates and/or usage for a location of the building. For example, the temperature setpoints may be automatically raised when energy demand rates increase and/or the electric grid has a cap on the amount of energy a particular building can use. In some embodiments, the building may switch to on-site energy generation in response to an indication identifying a change in energy rates and/or usage. On-site energy generation may include one or more renewable energy sources (e.g., solar, wind) or a natural gas fired combined heat and power plant (CHP).

In some embodiments, information generated as a result of process 100 may be used in controlling energy load for a building. Controlling energy load for the building may involve adjusting energy load for the building during a duration of time having high energy usage for a location of the building (e.g., peak energy usage). Energy load may include energy usage from devices within a building (e.g., heating, cooling, lighting, electric vehicles) and energy resources (e.g., energy storage, energy generation assets). Controlling energy load for the building may allow building owners and operators to manage energy usage during peak electricity periods and maintain a desired performance of the building.

In some embodiments, information generated as a result of process 100 may be used to provide indoor navigation information. Process 100 may be used in labeling points for a building, and this information may be inputted to an augmented or virtual reality software platform, which may allow a person to navigate building floors and spaces. In some embodiments, information generated as a result of process 100 may be used to in providing real-time data to a technician relating to status of one or more pieces of equipment in the building. The technician may provide information to a person at the building to allow the person to perform a guided repair of the one or more pieces of equipment.

In some embodiments, information generated as a result of process 100 may be used to provide elevator position information. Process 100 may be used in determining one or more of the points for a building associated with an elevator of the building. Data from these points may be used in monitoring position of the elevator, and the elevator position information may be provided to a person (e.g., a tenant of the building). The elevator position information may include an indication that the elevator is delayed or in need of service.

In some embodiments, information generated as a result of process 100 may be used to monitor water usage for a building. Process 100 may be used in determining one or more of the points for a building as being water flow sensors. Data from these points may be used in monitoring water usage for the building. Monitoring water usage for the building may include detecting a water leak for the building. Detecting a water leak may include detecting water usage occurring above a threshold value, and notifying a person (e.g., owner of the building, tenant of the building) of a possible water leakage. Monitoring water usage may be used by building owners and operators to monitor billing through the seasons or from particular tenants.

Figure 2:
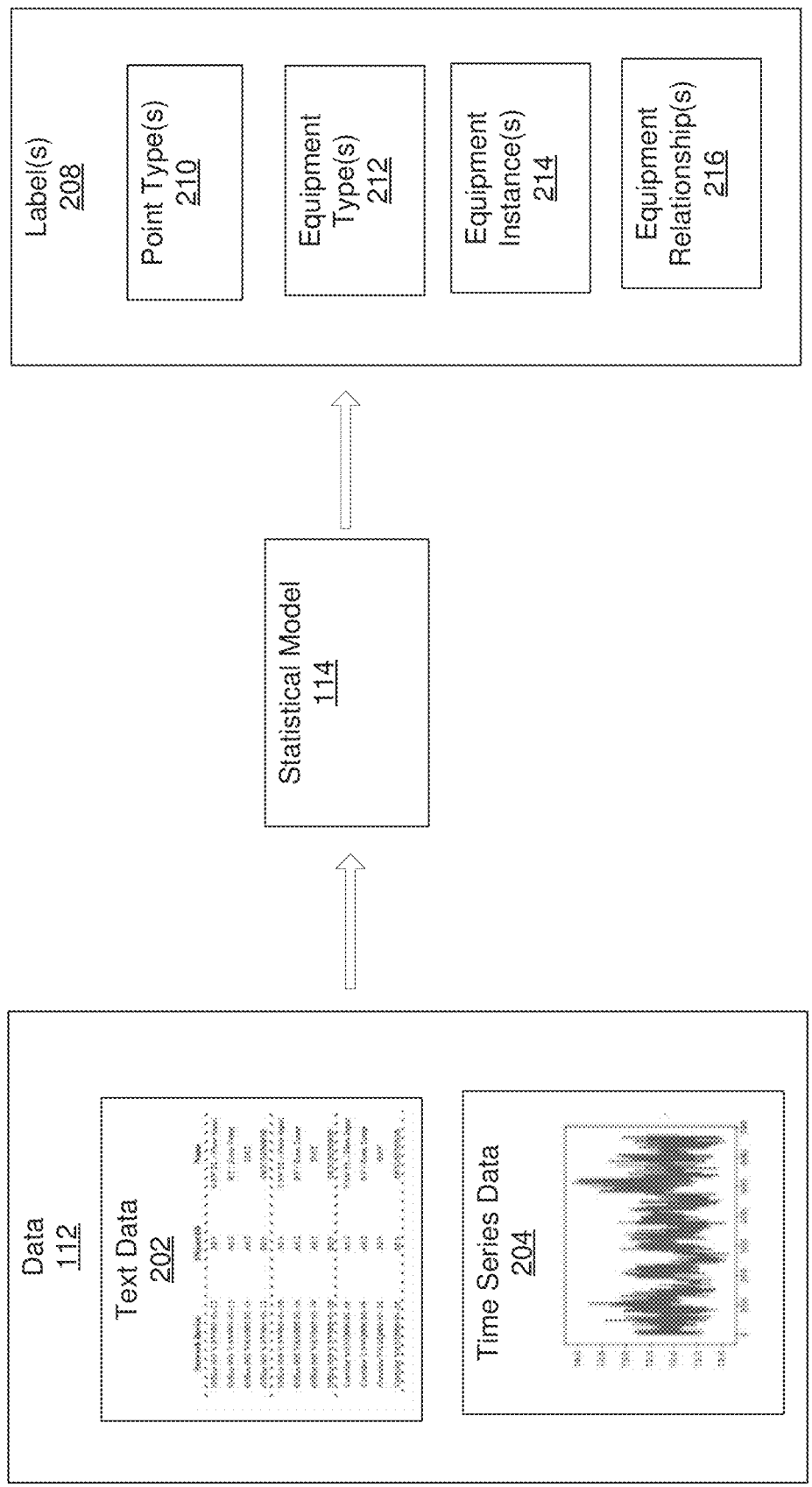
FIG. 2 is a schematic of an illustrative process for identifying label(s) for measurement point(s) and piece(s) of equipment located at the building using data obtained from a building control network and the statistical models described herein.

FIG. 2 is a schematic of an illustrative process for identifying label(s) for measurement point(s) and piece(s) of equipment located at the building using data obtained from a building control network and the statistical models described herein. As shown in FIG. 2, data 112 obtained from a building control network, such as building control network 110, may include text data 202 and time series data 204. Data 112 may correspond to point(s) associated with piece(s) of equipment located at a building controlled by the building control network, such as building 102. Data 112 may be provided as an input to statistical model 114 to obtain an output indicating label(s) 208. Label(s) 208 may include point type(s) 210, equipment type(s) 212, equipment instance(s) 214, and equipment relationship(s) 216. Point type(s) 210 may include a sensor, an actuator, a setpoint, and an alarm. Equipment type(s) may include an air handling unit, a variable-air-volume box, a boiler, a chiller, a fan, a filter, and a thermostat.

Some embodiments involve preprocessing of time series data 204 and providing the preprocessed time series data to statistical model 114. Examples of preprocessing of time series data 204 include removing one or more outliers or adding one or more missing values where there is no data value for a particular point in time. Removing one or more outliers may involve removing one or more data points in a raw data trace that are either below or above a threshold value.

Figure 17B:
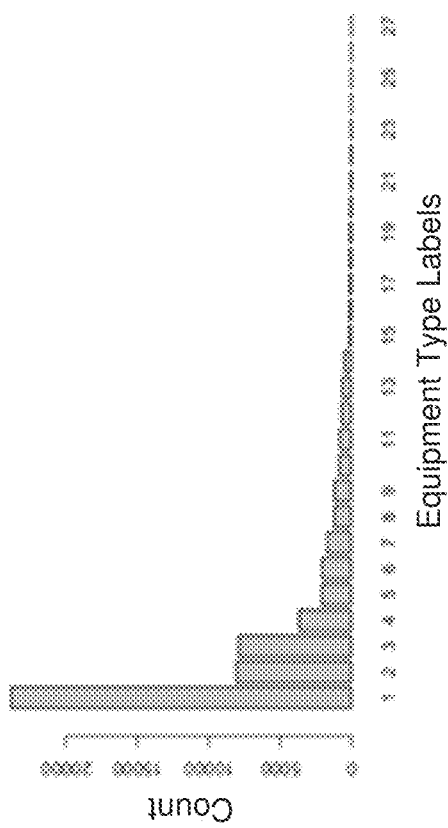
FIG. 17B is a plot of count number versus different equipment type labels for an example training data set that may be used training statistical models, in accordance with some embodiments of the technology described herein.
Figure 17A:
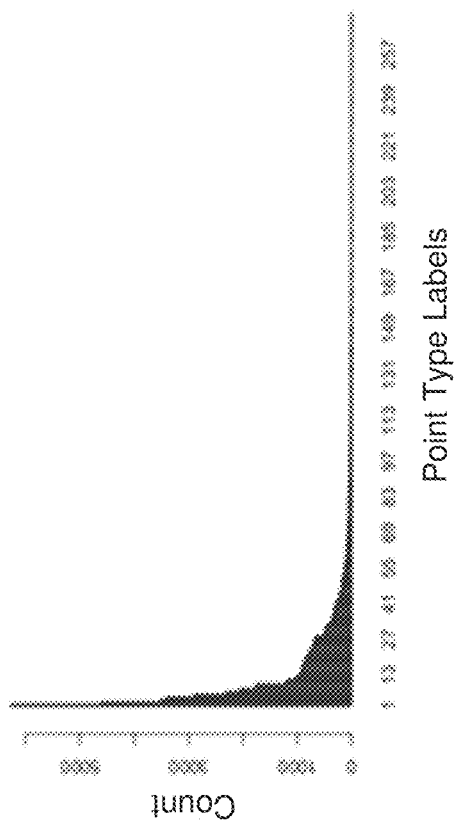
FIG. 17A is a plot of count number versus different point type labels for an example training data set that may be used training statistical models, in accordance with some embodiments of the technology described herein.

Some embodiments involve training statistical model 114 using training data corresponding to multiple point types and equipment types for different pieces of equipment. Training data may include data corresponding to at least 100 different point types, at least 200 different point types, or at least 300 different point types, in some embodiments. Training data may include data corresponding to at least 10 different equipment types, at least 20 different equipment types, or at least 25 different equipment types, in some embodiments. FIG. 17A is a plot of count number versus different point type labels for an example training data set that may be used training the statistical models described herein, such as statistical model 114. FIG. 17B is a plot of count number versus different equipment point type labels for an example training data set that may be used in training the statistical models described herein, such as statistical model 114. The training data may be obtained from points associated with multiple buildings. Training data may include data obtained from at least 10 buildings, at least 20 buildings, at least 50 buildings, or at least 100 buildings, in some embodiments.

Figure 3A:
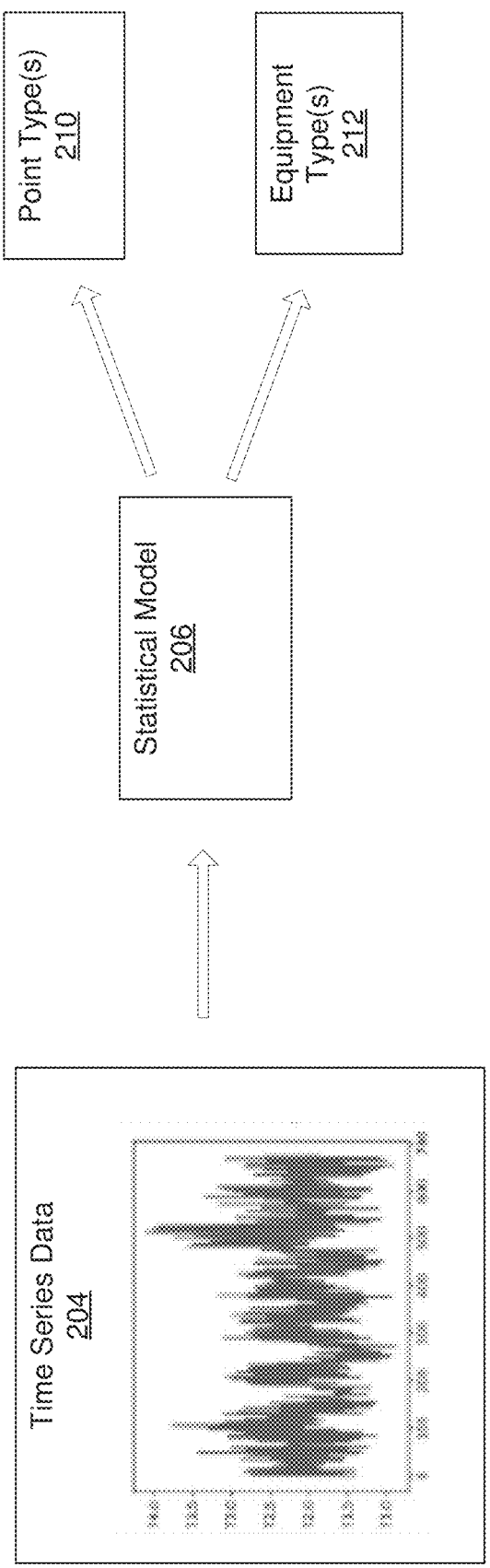
FIG. 3A is a schematic of an illustrative process for identifying point type(s) and equipment type(s) for measurement point(s) and piece(s) of equipment located at the building using time series data obtained from a building control network and the statistical models described herein.

Some embodiments involve providing time series data corresponding to point(s) associated with piece(s) of equipment located at a building controlled by the building control network as an input to statistical model to determine point type(s) and/or equipment type(s) for the point(s). FIG. 3A is a schematic of an illustrative process for identifying point type(s) and equipment type(s) for measurement point(s) and piece(s) of equipment located at the building using time series data obtained from a building control network and the statistical models described herein. As shown in FIG. 3A, time series data 204 may be provided as an input to statistical model 206 to obtain outputs indicating point type(s) 210 and equipment type(s) 212. Time series data 204 may be obtained for point(s) associated with piece(s) of equipment located at a building controlled by a building control network and may correspond to point(s) associated with the piece of equipment. Time series data 204 may include individual data traces, such as the example data trace shown in FIG. 3A, corresponding to individual points. Statistical model 206 may be trained using training data indicating multiple point types and multiple equipment types for different pieces of equipment.

Point type(s) 210 for point(s) associated with piece(s) of equipment may be determined using time series data 204 and statistical model 206. Point type(s) 210 may include a sensor, an actuator, a setpoint, and an alarm. Equipment type(s) 212 for point(s) associated with the piece(s) of equipment may be determined using time series data 204 and statistical model 206. Equipment type(s) 212 may include an air handling unit, a variable-air-volume box, a boiler, a chiller, a fan, a filter, and a thermostat.

Statistical model 206 may include one or more neural networks. Determining point type(s) 210 may involve providing time series data 204 as an input to the one or more neural networks and obtaining an output indicating point type(s) 210 as an output. Similarly, determining equipment type(s) 212 may involve providing time series data 204 data as an input to the one or more neural networks and obtaining an output indicating equipment type(s) 212 as an output. In some embodiments, statistical model 206 may include a 1-dimensional convolutional neural network. The 1-dimensional convolutional neural network may extract patterns from time series data 204 and map those patterns to point type(s) 210 and equipment type(s) 212. In some embodiments, training the one or more neural networks may involve performing layer normalization. Since time series data 204 obtained from different points may vary in magnitude, layer normalization may allow for comparing data obtained from different with each other. Since time series data 204 obtained from different points may belong to different measurement types and/or have different units, which may vary by orders of magnitude, layer normalization may allow for comparing these data from diverse data sources. The layer normalization may allow for comparing different magnitudes observed in points between buildings as well as mixed data types and scales, which may vary depending on the type of measurement being obtained (e.g., parts-per-million (ppm) for $CO_2$ concentration, kWh for energy consumption).

Some embodiments involve performing a normalization process on time series data 204 to obtain normalized time series data. The normalization process may process time series data 204 such that the data values are within a particular data range. Determining point type(s) 210 may involve providing the normalized time series data as an input to statistical model 206 and obtaining an output indicating point type(s) 210 as an output. Similarly, determining equipment type(s) 212 may involve providing the normalized time series data as an input to statistical model 206 and obtaining an output indicating point type(s) 212 as an output.

Figure 3B:
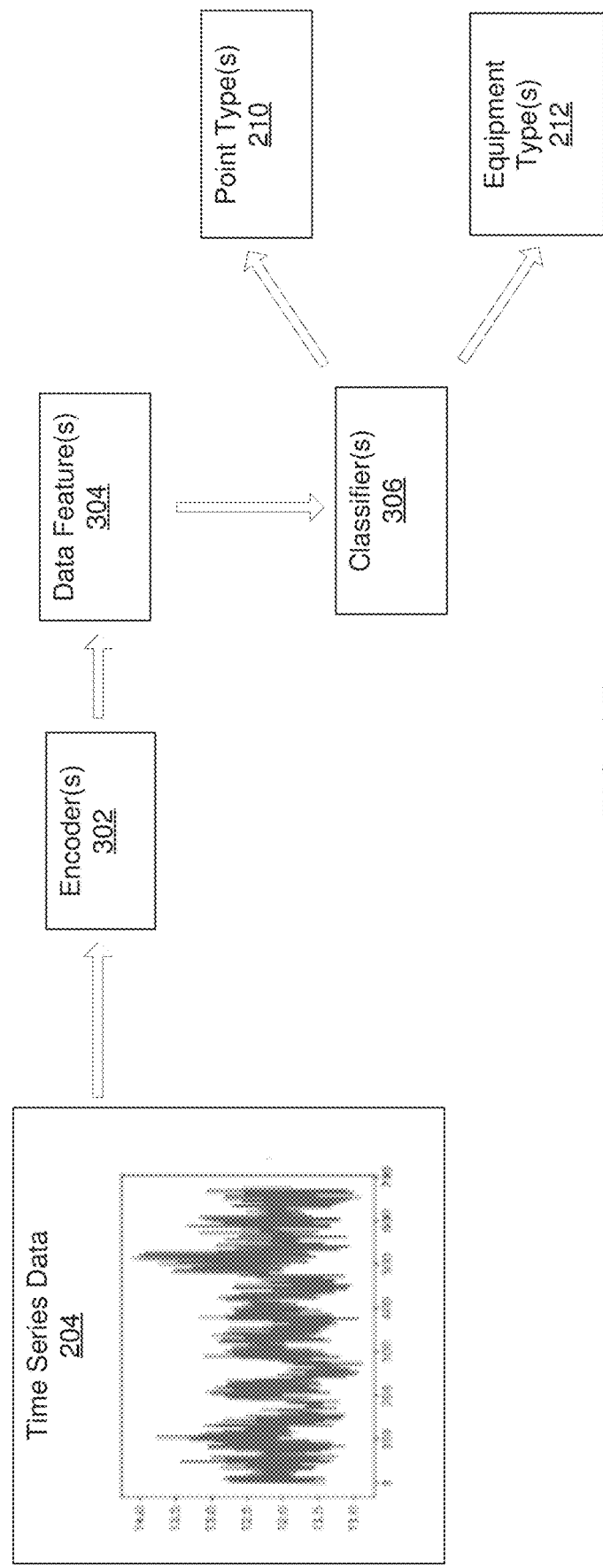
FIG. 3B is a schematic of an illustrative process for identifying point type(s) and equipment type(s) using encoder(s) to generate data feature(s) for the time series data and classifier(s) to determine the point type(s) and the equipment type(s), in accordance with some embodiments of the technology described herein.

In some embodiments, statistical models include encoder(s) used to obtain feature(s) of time series data and classifier(s) that use the feature(s) to identify point type(s) and equipment type(s) of the time series data. FIG. 3B is a schematic of an illustrative process for identifying point type(s) and equipment type(s) using encoder(s) to generate data feature(s) for the time series data and classifier(s) to determine the point type(s) and the equipment type(s). As shown in FIG. 3B the statistical model includes encoder(s) 302 and classifier(s) 306. Time series data 204 may be provided as an input to encoder(s) 302 to obtain an output indicating data feature(s) 304 of time series data 204. Data feature(s) 304 may be provided as an input to classifier(s) 306 to obtain outputs indicating point type(s) 210 and equipment type(s) 212.

Examples of classifier(s) 306 include, but are not limited to, a support vector machine classifier, a logistic regression classifier, a gradient boosted classifier, a decision tree classifier, a Bayesian classifier, a Bayesian network classifier, a random forest classifier, a k-nearest neighbors classifier, a neural network classifier, and an extremely randomized trees classifier. Examples of software packages that may be used for implementing classifier(s) 306 include Python's scikit-learn package (scikit-learn.org/stable/), PyTorch package (pytorch.org/), and SciPy package (scipy.org).

Classifier(s) 306 may output predictions indicating whether time series data 204 is categorized as being particular point types and/or equipment types. In some embodiments, classifier(s) 306 may output predictions for multiple point types, including a sensor, an actuator, a setpoint, and an alarm. In some embodiments, classifier(s) 306 may output predictions for multiple equipment types, including an air handling unit, a variable-air-volume box, a boiler, a chiller, a fan, a filter, and a thermostat. The predictions may include values output by classifier(s) 306 corresponding to different point types and/or equipment types. Determining a point type for time series data 204 may involve selecting, based on the values corresponding to multiple point types, a point type for time series data 204. Determining an equipment type for time series data 204 may involve selecting, based on the values corresponding to multiple equipment types, an equipment type for time series data 204.

In some embodiments, classifier(s) 306 may include one or more binary classifiers. A binary classifier may correspond to a particular label, such as a particular point type and/or equipment type. The binary classifier may output a prediction indicating whether the time series data is categorized as being a particular point type and/or equipment type. In some embodiments, classifier(s) 306 may include a first classifier for a first point type and a second classifier for a second point type. For example, the first point type may be a temperature sensor and the second point type may be a temperature set point. The first classifier may output a prediction indicating whether the time series data is categorized as being a temperature sensor, and the second classifier may output a prediction indicating whether the time series data is categorized as being a set point. Using the outputs from both the first classifier and the second classifier, the time series data may be categorized as being either the temperature sensor or the temperature set point.

Data feature(s) 304 may include a mean value, a median value, a standard deviation value, a kurtosis value, a skewness value, a minimum value, a maximum value, a median absolute deviation value, a mean absolute deviation value, and an interquartile range value, an autocorrelation value for time series data 204.

In some embodiments, data feature(s) 304 may include a correlation value between data obtained from two different points. Time series data 204 may include time series data obtained from a first point and a second point and a correlation value between the time series data obtained from the first point and the second point. Data feature(s) 304 may include the correlation value, which may be provided as an input to classifier(s) 306 to determine point type(s) 210 and equipment type(s) 212. Some point types, such as temperature sensors, may correlate with outdoor temperature. In some embodiments, data feature(s) 306 may include a correlation value between time series data 204 and outdoor temperature for a location of the building.

Fourier harmonic(s) of time series data 204 may also be used to obtain data feature(s) 304. In some embodiments, data feature(s) 304 may include one or more amplitudes of Fourier harmonic(s) of time series data 204. In some embodiments, data feature(s) 304 may include one or more frequencies corresponding to Fourier harmonic(s) of time series data 204.

Data feature(s) 304 may include features indicative of a format of time series data 204, particularly as formatting may differ for different types of points. In some embodiments, data feature(s) 304 may include a percentage of data values in time series data 204 containing a decimal point. Some point types, such as set points, may have a high number of data values that are integer numbers (e.g., 1, 5, 10, etc.) in the time series data. As such, when the percentage of data values containing a decimal point for a particular point is low, then this feature may indicate that the point may be a set point. This data feature may aid in distinguishing between temperature set points that are likely to have a low percentage of data values with decimal points and temperature sensor points that are likely to have a high percentage of data values with decimal points. As another example, data that is likely to have a low percentage of values with decimal points is data that includes binary values, such as data originating from enable/disable commands and alarms. As yet another example, data that is likely to have a low percentage of values with decimal points is data that includes concentration values (e.g., values measured in particles per million (ppm)), such as data originating from $CO_2$ sensors.

Another type of data feature indicative of a format of time series data is the ratio of consecutive data values that are constant or substantially similar with respect to one or more prior data values with respect to total number of data values. Some point types, such as set points, may have a higher number of consecutive constant data values since they may not change as often as other types of points, such as temperature sensor points. In contrast, other point types, such as temperature sensor points, may have data values that change more frequently than a set point and this ratio may be low. Accordingly, in some embodiments, data feature(s) 304 may include a ratio of consecutive data values in time series data 204 that are the same or substantially similar to a total number of data values in the first data. Other examples of point types that may have a higher number of consecutive constant data values may include alarms, enable/disable commands, and damper positions.

Figure 3C:
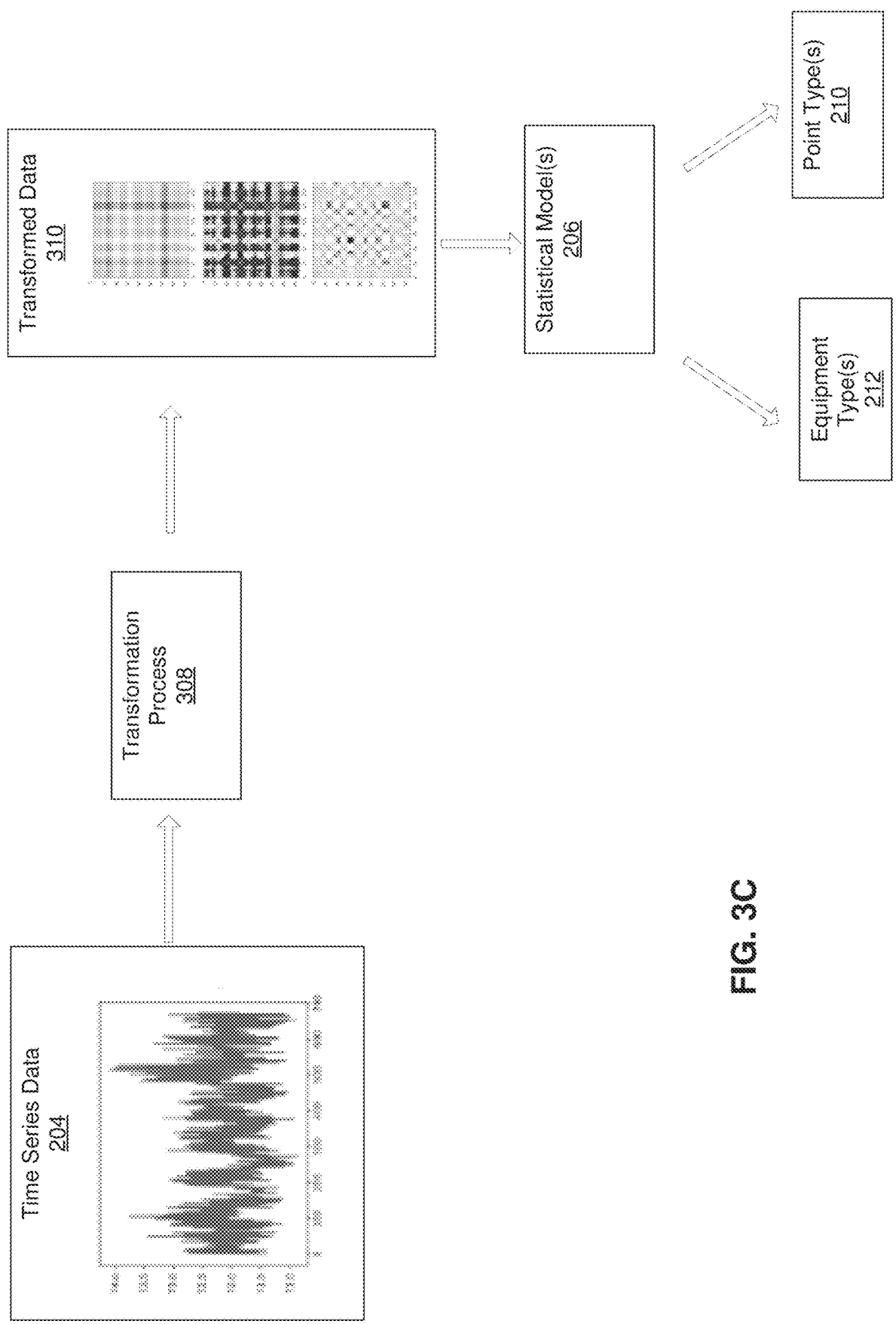
FIG. 3C is a schematic of an illustrative process for identifying point type(s) and equipment type(s) using a transformation process to obtain transformed time series data, in accordance with some embodiments of the technology described herein.

Some embodiments involve applying a multidimensional transformation process to time series data and then using the transformed data as an input to statistical model(s). The multidimensional transformation process may transform the time series data into a multidimensional array. The multidimensional array may provide certain benefits in representing patterns or correlations in the time series data, which may improve the ability of some statistical models to learn such patterns and correlations. FIG. 3C is a schematic of an illustrative process for identifying point type(s) and equipment type(s) using a transformation process to obtain transformed time series data. As shown in FIG. 3C, transformation process 308 may be applied to time series data 204 to obtain transformed data 310. Transformed data 310 may be provided as an input to statistical model(s) 206 to obtain equipment type(s) 212 and point type(s) 210 as an output. As discussed herein, statistical model(s) 206 may include a neural network (e.g., a convolutional neural network). Transformation process 308 may include one or more multidimensional transformation processes, and transformed data 310 output by transformation process 308 may include a multidimension representation of time series data 204. In some embodiments, transformed data 310 may include a multidimensional matrix, such as shown in FIG. 3C. Transformed data 310 may be provided as an input to the neural network to obtain equipment type(s) 212 and point type(s) 210 as an output.

In some embodiments, transformation process 308 may include a geometrical transformation process. The geometrical transformation process may generate transformed data that represents correlations between different segments of the time series data. An example of a geometrical transformation process is Gramian Angular Difference Field (GADF), Gramian Angular Summation Field (GASF), and Gramian Angular Field (GAF). In some instances, GAF transformations may be considered as the combination of a GADF transformation and a GASF transformation. For example, a multidimensional matrix obtained from a GADF transformation may be stacked with another multidimensional matrix obtained from a GASF transformation. In some embodiments, transformation process 308 may include a probabilistic transformation process. The probabilistic transformation process may generate transformed data that represents transition probabilities of the time series data, such as the probability of transition from one range of values to another. An example of a probabilistic transformation process is Markov Transition Fields (MTF). Further examples of GAF and MTF transformation processes are described in "Imagining Time-Series to Improve Classification and Imputation" by Zhiguang Wang and Tim Oates (arxiv.org/abs/1506.00327), which is incorporated by reference in its entirety.

Figure 4A:
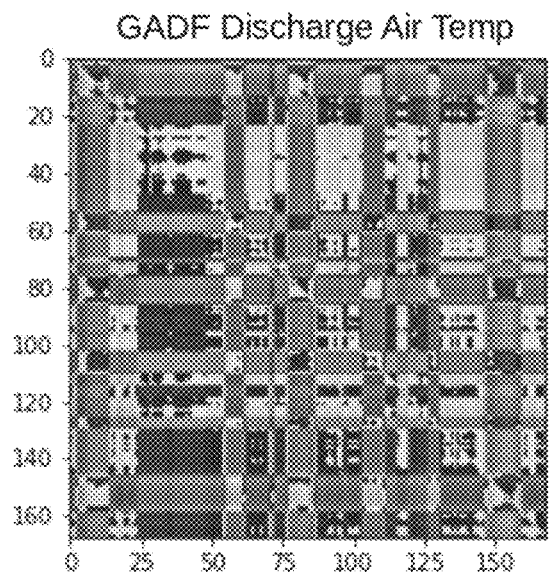
FIG. 4A is an example multidimensional matrix obtained by applying GADF transformation to time series data corresponding to a discharge air temperature sensor, in accordance with some embodiments of the technology described herein.
Figure 4B:
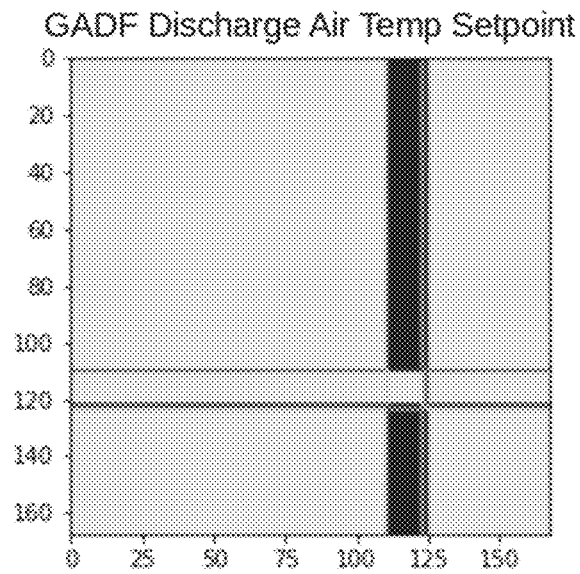
FIG. 4B is an example multidimensional matrix obtained by applying GADF transformation to time series data corresponding to a discharge air temperature setpoint, in accordance with some embodiments of the technology described herein.
Figure 4C:
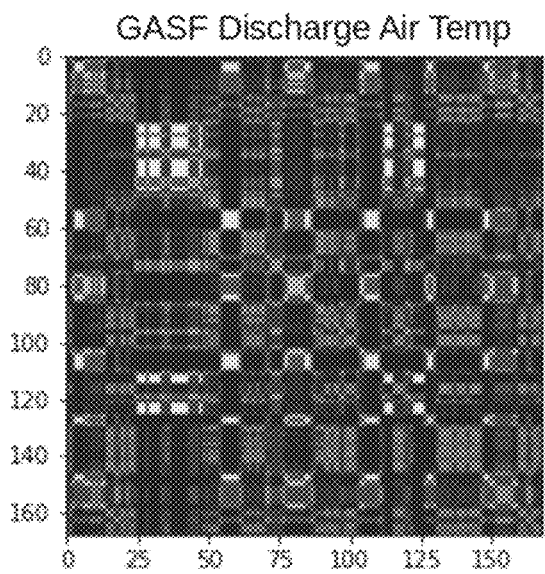
FIG. 4C is an example multidimensional matrix obtained by applying GASF transformation to time series data corresponding to a discharge air temperature sensor, in accordance with some embodiments of the technology described herein.
Figure 4D:
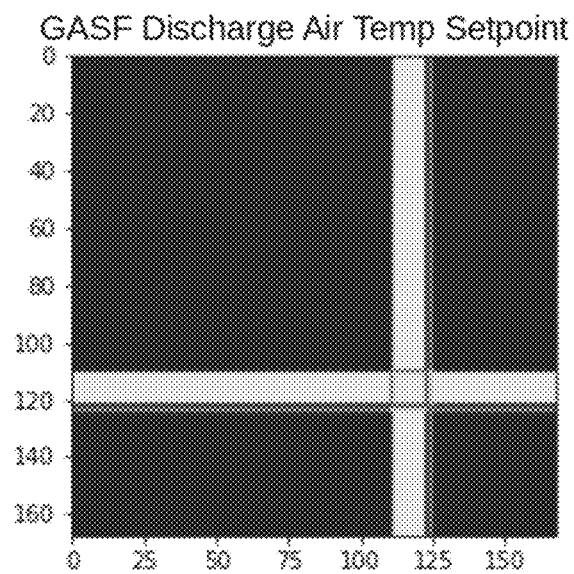
FIG. 4D is an example multidimensional matrix obtained by applying GASF transformation to time series data corresponding to a discharge air temperature setpoint, in accordance with some embodiments of the technology described herein.
Figure 5A:
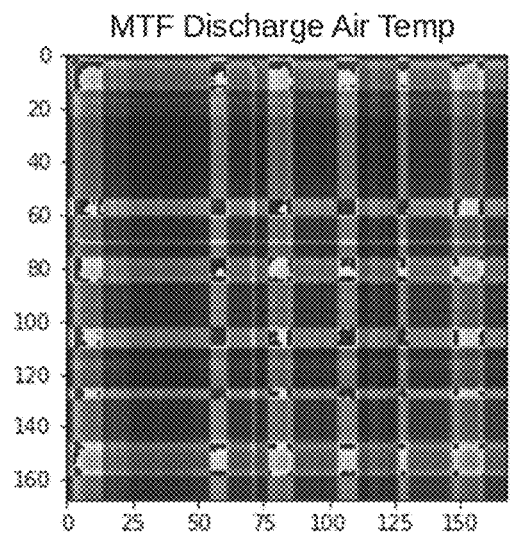
FIG. 5A is an example multidimensional matrix obtained by applying MTF transformation to time series data corresponding to a discharge air temperature sensor, in accordance with some embodiments of the technology described herein.
Figure 5B:
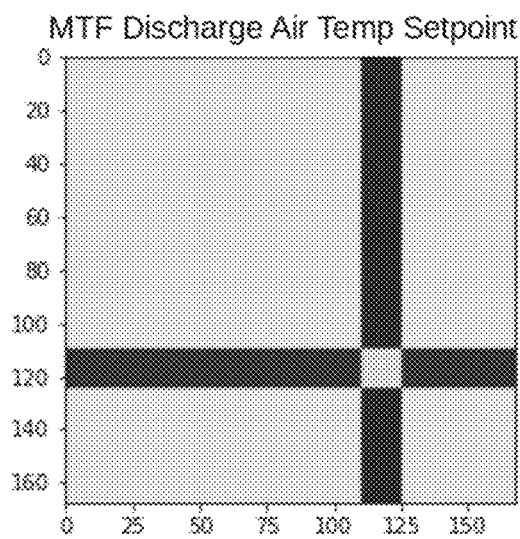
FIG. 5B is an example multidimensional matrix obtained by applying MTF transformation to time series data corresponding to a discharge air temperature setpoint, in accordance with some embodiments of the technology described herein.
Figure 5C:
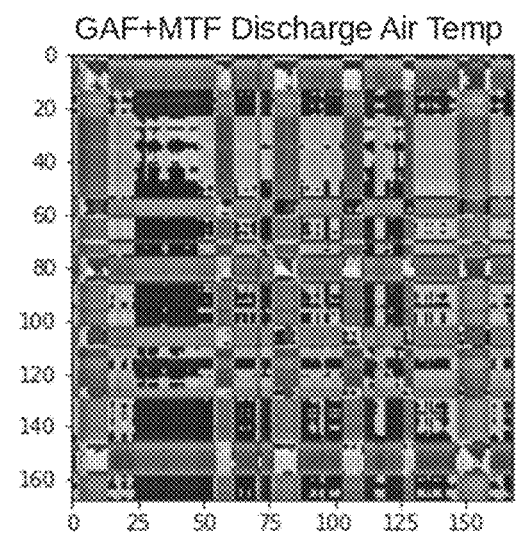
FIG. 5C is an example multidimensional matrix obtained by applying a combination of GAF and MTR transformations to time series data corresponding to a discharge air temperature sensor, in accordance with some embodiments of the technology described herein.
Figure 5D:
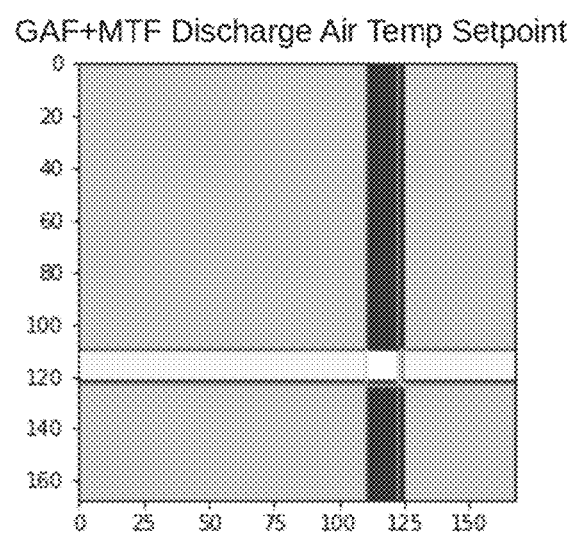
FIG. 5D is an example multidimensional matrix obtained by applying a combination of GAF and MTR transformations to time series data corresponding to a discharge air temperature setpoint, in accordance with some embodiments of the technology described herein.

FIGS. 4A-D and FIGS. 5A-D illustrate different example multidimensional matrices obtained by applying multidimensional transformation(s) to time series data for different types of points. FIG. 4A is an example multidimensional matrix obtained by applying GADF transformation to time series data corresponding to a discharge air temperature sensor. FIG. 4B is an example multidimensional matrix obtained by applying GADF transformation to time series data corresponding to a discharge air temperature setpoint. FIG. 4C is an example multidimensional matrix obtained by applying GASF transformation to time series data corresponding to a discharge air temperature sensor. FIG. 4D is an example multidimensional matrix obtained by applying GASF transformation to time series data corresponding to a discharge air temperature setpoint. FIG. 5A is an example multidimensional matrix obtained by applying MTF transformation to time series data corresponding to a discharge air temperature sensor. FIG. 5B is an example multidimensional matrix obtained by applying MTF transformation to time series data corresponding to a discharge air temperature setpoint. FIG. 5C is an example multidimensional matrix obtained by applying a combination of GAF and MTR transformations to time series data corresponding to a discharge air temperature sensor. FIG. 5D is an example multidimensional matrix obtained by applying a combination of GAF and MTR transformations to time series data corresponding to a discharge air temperature setpoint. The combination of GAF and MTR shown in FIGS. 5C and 5D may be obtained by stacking a matrix obtained by applying a GAF transformation to the time series data and a matrix obtained by applying a MTR transformation to the time series data. As shown in these figures, the multidimensional matrices for the discharge air temperature sensor (FIGS. 4A, 4C, 5A, 5C) have different features than the multidimensional matrices for the discharge air temperature setpoint (FIGS. 4B, 4D, 5B, 5D), illustrating how these multidimensional matrices can be used to differentiate between different point types.

In some embodiments, transformation process 308 may include performing several multidimensional transformation processes on time series data 204 to obtain two or more multidimensional matrices representing time series data 204. The two or more multidimensional matrices may be combined as an input to statistical model(s) 206 to obtain equipment type(s) 212 and point type(s) 210. For example, a first multidimensional transformation process may be used to obtain a first multidimensional matrix and a second multidimensional transformation process may be used to obtain a second multidimensional matrix. In some embodiments, the first multidimensional matrix and the second multidimensional matrix may be combined by stacking the first multidimensional matrix and the second multidimensional matrix along another dimension. In some embodiments, combining the first multidimensional matrix and the second multidimensional matrix may involve summing, multiplying, or some other mathematical operation to the first multidimensional matrix and the second multidimensional matrix.

It should be appreciated that although the multidimensional matrices shown in FIGS. 3C, 4A-D, and 5A-D are 2-dimensional or 3-dimensional matrices, transformation process 308 may involve outputting transformed data 310 having any suitable number of dimensions as the techniques described herein are not limited in this respect. For example, transformed data 310 may have 4-dimensions, 5-dimensions, 6-dimensions, or 7-dimensions, in some embodiments.

Some embodiments may involve processing time series data 204 to obtain process data and providing the processed data to transformation process 308. The processing may depend on the type of transformation process being used. For example, if transformation process 308 includes GAF transformation, then processing time series data 204 may include scaling time series data 204 so that data values are in the range of 0 to 1. As another example, if transformation process 308 includes MTF transformation, then processing time series data 204 may include discretizing time series data 204 into bins corresponding to a range of values such that data values for time series data 204 fall into one of the bins. In addition, processing time series data 204 may include calculating transition probabilities of transitioning from one bin to another bin.

Figure 6:
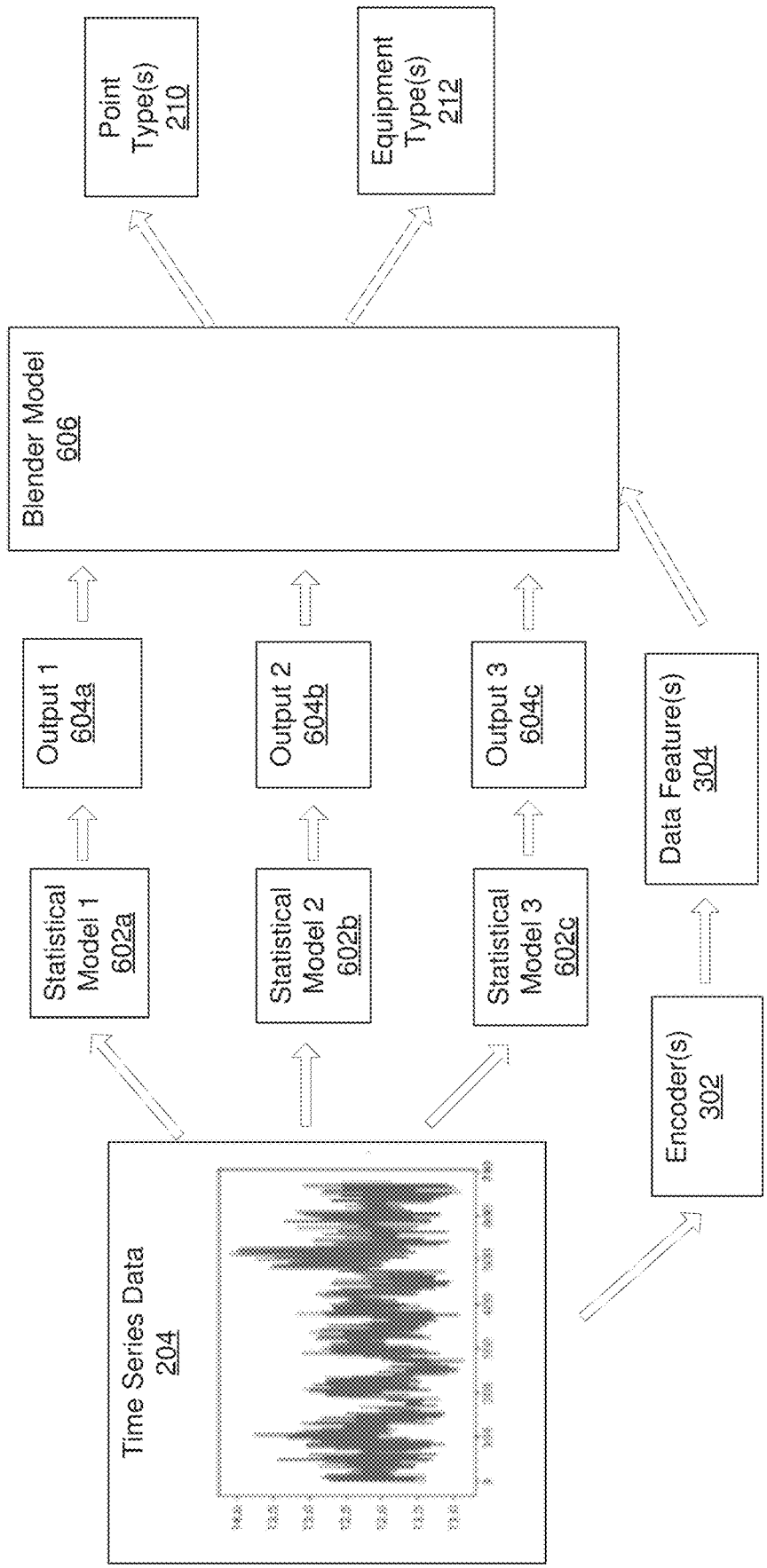
FIG. 6 is a schematic of an illustrative process for determining point type(s) and equipment type(s) using multiple statistical models to obtain outputs that are provided as input to a blender model, in accordance with some embodiments of the technology described herein.

Some embodiments may involve providing time series data to multiple statistical models to obtain multiple outputs. The outputs may be provided as an input to a statistical model that relates the outputs to point type(s) and/or equipment type(s) for the time series data. In such instances, the statistical model that receives the multiple outputs may be referred to as a "blender model" because it combines the outputs of multiple statistical models to obtain point type(s) and/or equipment type(s). FIG. 6 illustrates determining point type(s) and equipment type(s) using multiple statistical models to obtain outputs that are provided as input to a blender model. As shown in FIG. 6, time series data 204 may be provided as an input to statistical model 1 602*a*, statistical model 2, 602*b*, and statistical model 3 602*c* to obtain output 1 604*a*, output 2 604*b*, and output 3 604*c*, respectively. Output 1 604*a*, output 2 604*b*, and output 3 604*c* may be provided as inputs to blender model 606 to obtain point type(s) 210 and equipment type(s) 212.

Statistical model 1 602*a*, statistical model 2, 602*b*, and statistical model 3 602*c* may have different model architectures. For example, statistical model 1 602*a* may include a neural network, statistical model 2 602*b* may include a combination of encoder(s) and classifier(s), such as encoder(s) 302 and classifier(s) 306 discussed in connection with FIG. 3B, and statistical model 2 602*c* may include a convolutional neural network that uses multidimensional matrices, such as obtained by applying transformation process 308 to time series data, as input. In this way, blender model 606 may allow for the combination of more than one statistical model in determining point type(s) 210 and equipment type(s) 212.

Blender model 606 may include one or more classifiers. Blender model 606 may output predictions indicating whether a combination of time series data 204 is categorized as being particular point types and/or equipment types. In some embodiments, blender model 606 is a machine learning classifier. Examples of machine learning classifiers that may be used in blender model 606 include, but are not limited to, a support vector classifier, a logistic regression classifier, and a random forest classifier. In some embodiments, blender model 606 is a rule-based classifier. Examples of rule-based classifiers that may be used in blender model 606 include, but are not limited to, a majority voting classifier and a weighted majority classifier.

In some embodiments, data feature(s) 304 may be provided as input to blender model 606 as part of determining point type(s) 210 and equipment type(s) 212, as shown in FIG. 6. As discussed herein, time series data 204 may be provided as input to encoder(s) 302 to obtain data feature(s) 304.

Figure 7:
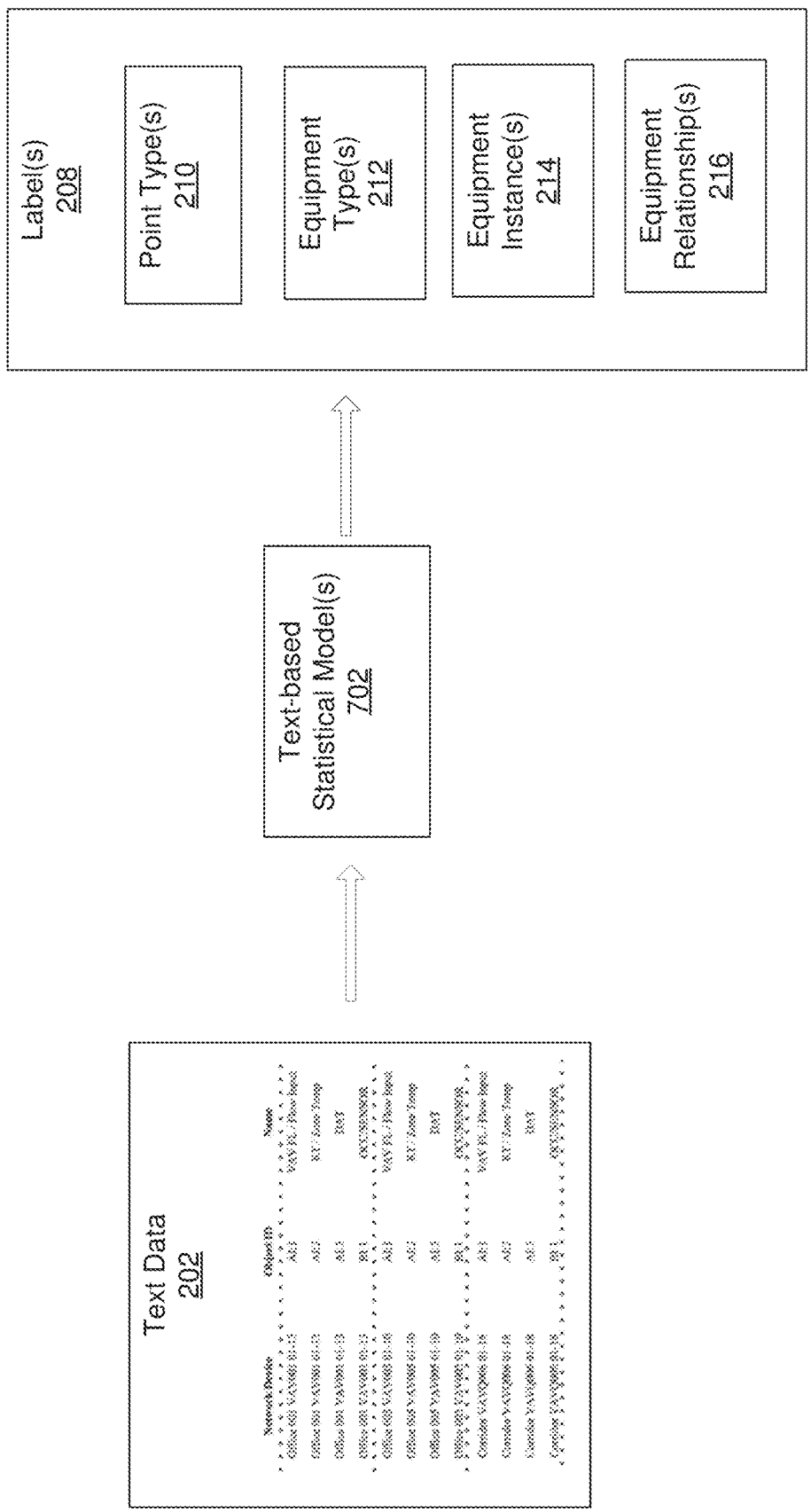
FIG. 7 is a schematic of an illustrative process for determining label(s) using text data and statistical model(s) relating text data to label(s), in accordance with some embodiments of the technology described herein.
Figure 18:
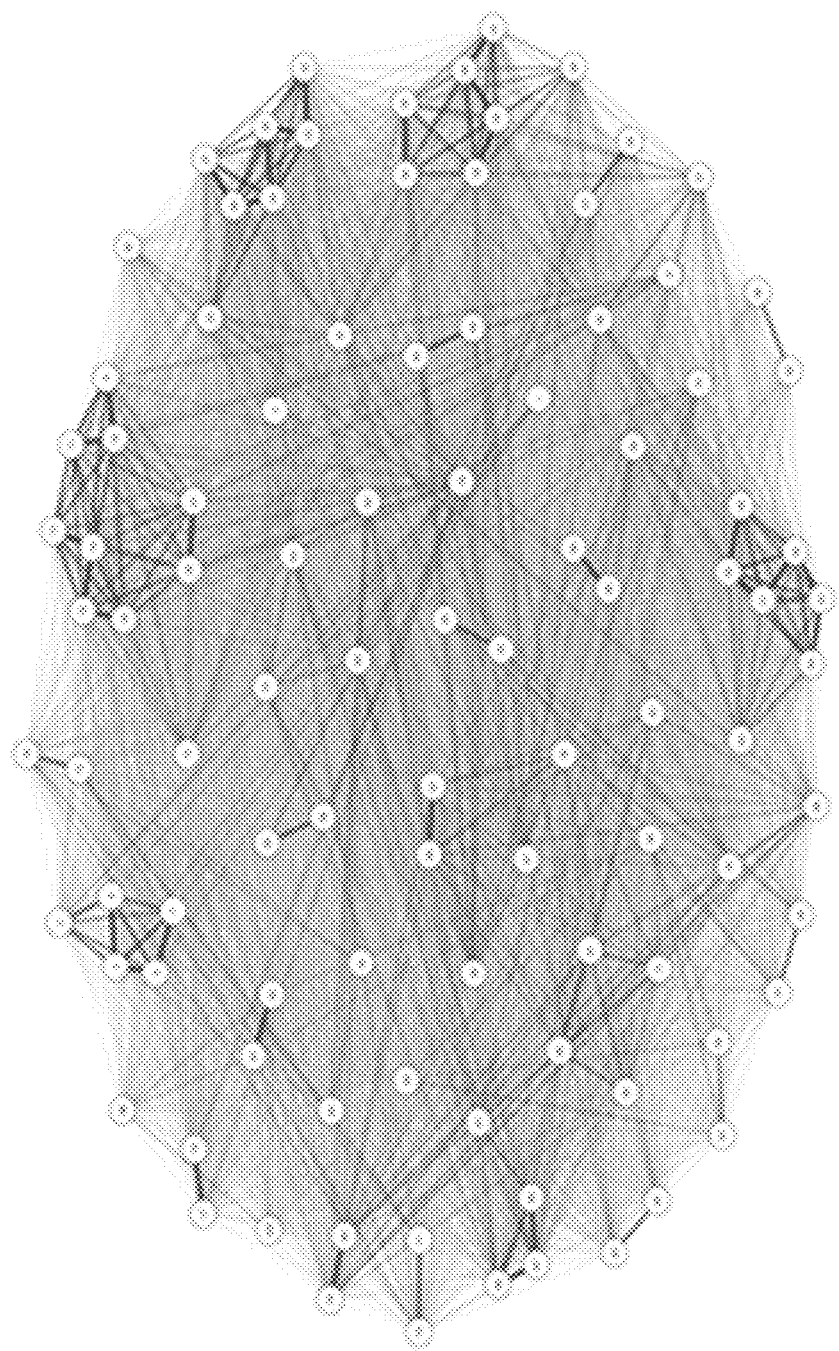
FIG. 18 is an example of a visual representation of equipment clusters for points in a building identified using the technology described herein.

Some embodiments use text data obtained from a building control network to determine label(s) for points located at a building controlled by the building control network. FIG. 7 is a schematic of an illustrative process for determining label(s) by providing text data obtained from a building control network to statistical model(s) to obtain label(s). As this type of statistical model receives text data as an input, such a model is also referred to herein as a "text-based statistical model." As shown in FIG. 7, text data 202 may be provided as an input to text-based statistical model(s) 702 to obtain label(s) 208 as an output. Label(s) 208 may include point type(s) 210, equipment type(s) 212, equipment instance(s) 214, and equipment relationship(s) 216. Statistical model(s) 702 may include a clustering-based classifier. Statistical model(s) 702 may include a clustering technique (e.g., Partitioning Around Medoids (PAM), k-means, and k-medoids). An example software package used in implementing PAM is the cluster package in R (cran.r-project.org/web/packages/cluster/index.html). FIG. 18 is an example of a visual representation of equipment clusters for 100 points in a building where points with the lines in bold and closer in proximity are most similar.

Figure 8:
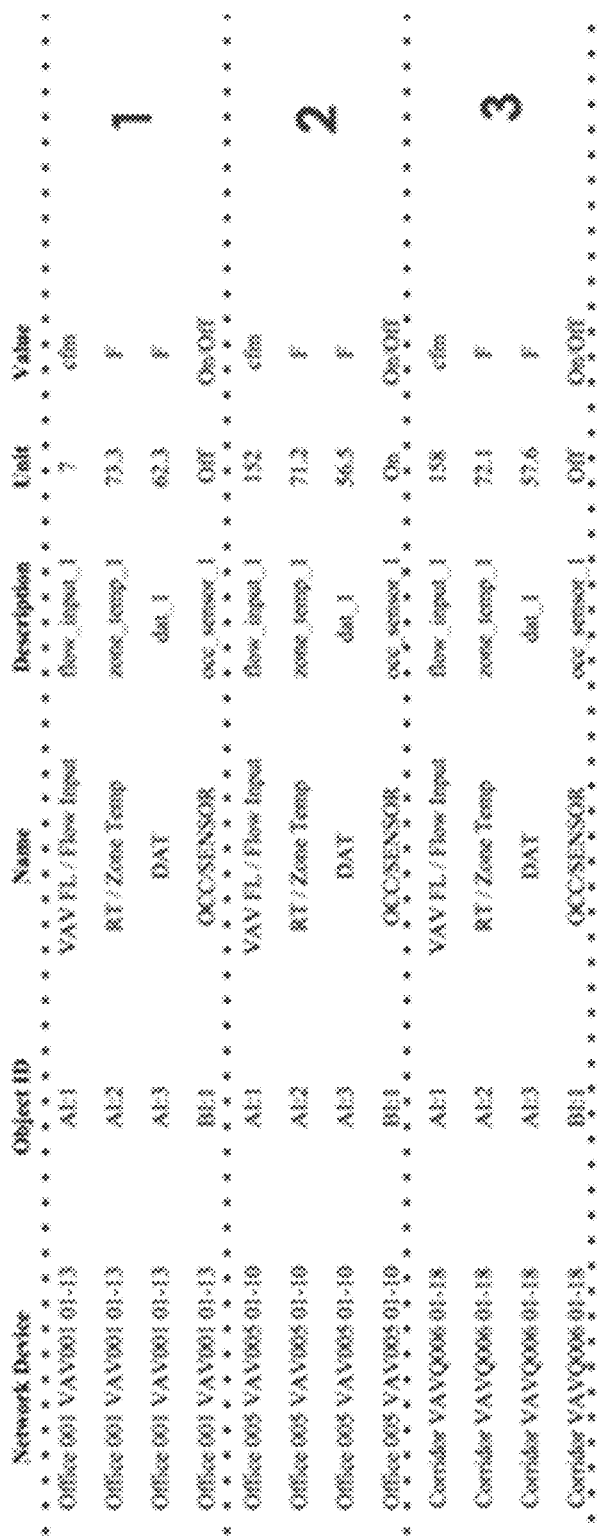
FIG. 8 shows an example of text data obtained from a building control network having a structured format, in accordance with some embodiments of the technology described herein.

Text data 202 may include structured data and unstructured data. Text data 202 may have a structured format, using rows and columns, and may be stored in a relational database. FIG. 8 shows an example of text data obtained from a building control network having a structured format. Individual rows correspond to different points in a building controlled by the building control network. As shown in FIG. 8, the columns correspond to the attributes of "Network Device", "Object ID", "Name", "Description", "Unit", and "Value".

In some embodiments, text data 202 and text-based statistical model(s) 702 may be used to determine equipment instance(s) 216 for the points corresponding to text data 202. For example, a row in text data 202 may correspond to a particular point in a building controlled by a building control network and some or all or the text data in the row may be provided as input to text-based statistical model(s) 702 to determine an equipment instance for the row. A group of points having the same equipment instance may identify those points as being associated with a particular piece of equipment. For example, the first four rows of text data shown in FIG. 8 correspond to four different points. Using one or more text-based statistical models, such as text-based statistical model(s) 702, an equipment instance for each of these points may be identified as being associated with the same piece of equipment. In FIG. 8, this is shown by the dotted lines above the first row and between the fourth and fifth rows where the first four rows are labeled with "1," indicating that they are associated with a group of points having the same equipment instance for a variable-air volume (VAV) box. Similarly, the next four rows are associated with a group of points labeled with "2," indicating that they have the same equipment instance for a variable-air volume (VAV) box. The last four rows are also associated with a group of points labeled with "3," indicating that they have the same equipment instance for a variable-air volume (VAV) box.

As the row numbers of text data 202 may provide information about equipment instance, some embodiments may involve providing information identifying row numbers for text data 202 as an input to text-based statistical model(s) 702 to obtain an output indicating equipment instance(s) 214. In some embodiments, the information identifying row numbers for text data 202 may include a vector including the row numbers. The vector including the row numbers may be provided as input to text-based statistical model(s) 702 to obtain an output indicating equipment instance(s) 214.

In some embodiments, text-based statistical model(s) 702 may include an edge detection process for detecting "edges" between groups of points in the text data. In particular, text data may include a structured format having different rows corresponding to different points, such as shown in FIG. 8. The edge detection process may involve detecting groups of consecutive rows based on cluster purity. Groups of consecutive rows that have a high cluster purity may be predicted as having the same equipment instance and one or more "edges" may be detected between one of these groups and neighboring rows in the text data. These "edges" are illustrated in FIG. 8 by the horizontal dashed lines. In some embodiments, the edge detection process may include comparing one row to another row in the text data to determine a difference between the rows and comparing the difference to a detection threshold to determine whether an edge exists between the two rows.

In some embodiments, a group of points corresponding to an equipment instance may include points having different point types. The different point types may include two or more of: a sensor, an actuator, a setpoint, and an alarm. For example, an equipment instance for a variable-air-volume box may include a flow input sensor, a discharge air temperature sensor, and a temperature setpoint. As another example, an equipment instance for an air-handling unit may include an outdoor air sensor, a heating coil temperature sensor, a cooling coil temperature sensor, and a supply air temperature sensor. As yet another example, an equipment instance for a pump may include an on/off command controller, a speed sensor, and a flow sensor.

Figure 19A:
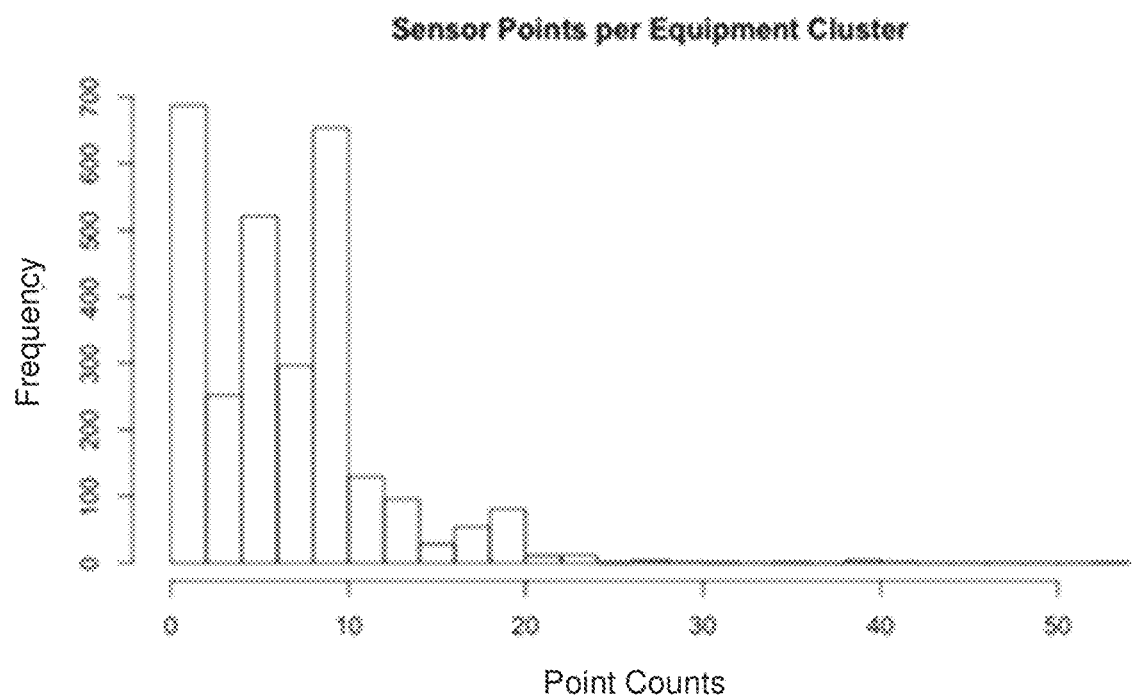
FIG. 19A is a distribution plot illustrating the frequency of number of points occurring multiple equipment instances, in accordance with some embodiments of the technology described herein.

An equipment instance may include any suitable number of points associated with a particular piece of equipment. In some embodiments, an equipment instance may include at least 1 point, at least 3 points, at least 5 points, at least 7 points, at least 10 points, or at least 15 points. In some embodiments, an equipment instance may include 1-5 points, 3-10 points, 3-15 points, or 3-50 points. FIG. 19A is a distribution plot illustrating the frequency of number of points occurring multiple equipment instances.

Figure 19B:
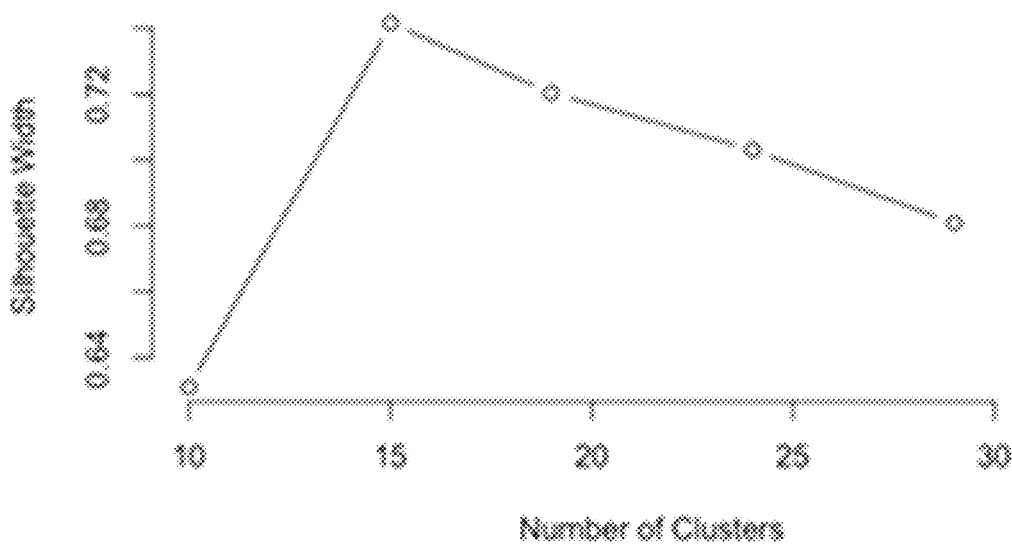
FIG. 19B is a plot of Silhouette Width versus initial number of clusters for an example data set obtained from 100 points in a building, in accordance with some embodiments of the technology described herein.
Figure 20:
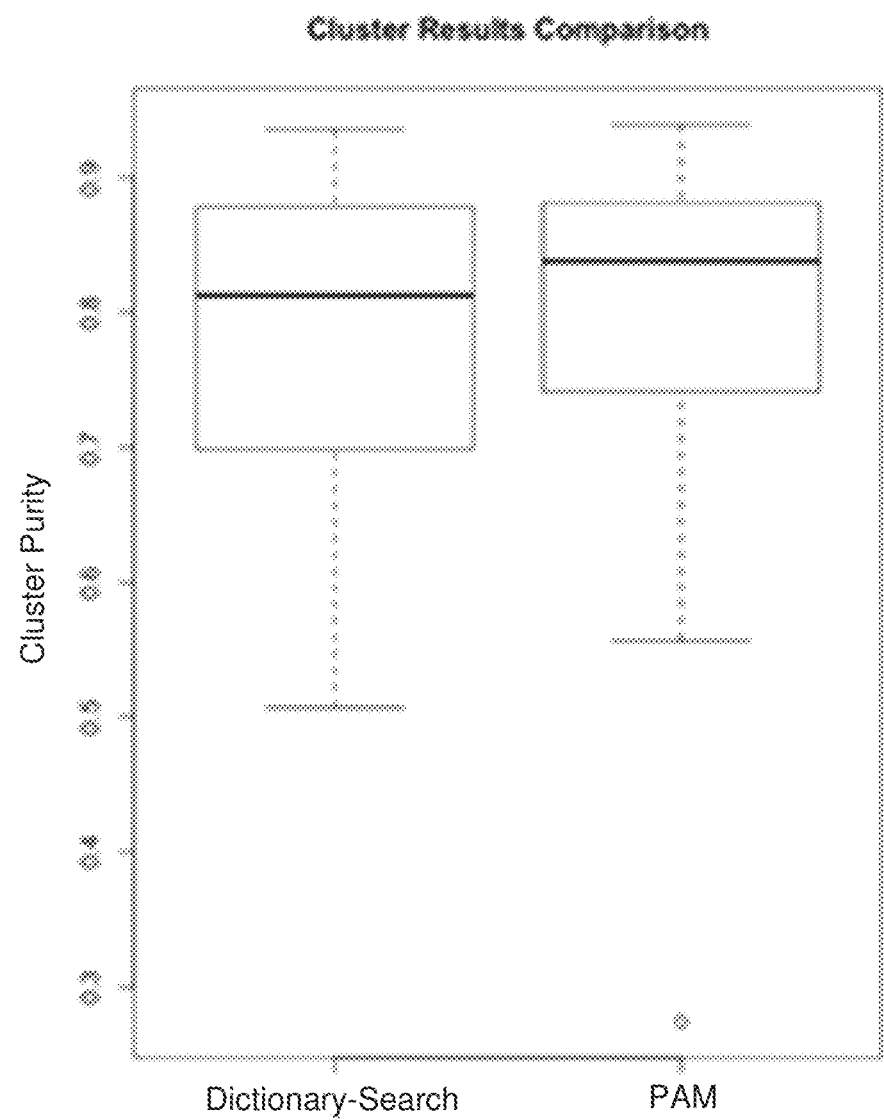
FIG. 20 is a box plot illustrating cluster purity achieved using techniques described herein to determine clusters of points corresponding to equipment instances, in accordance with some embodiments of the technology described herein.

According to some embodiments, text-based statistical model(s) 702 may include a clustering-based classifier. Determining equipment instance(s) 214 may involve inputting an initial number of clusters. The initial number of clusters may correspond to an initial estimate for the number of equipment instances of a building. In some embodiments, the initial number of clusters is 15. In some embodiments, the initial number of clusters may be in the range of 10-20, 15-25, or 10-30. FIG. 19B is a plot of silhouette width versus initial number of clusters for an example data set obtained from 100 points in a building. The silhouette width is a measure of within-cluster relatedness. For this data set, an initial number of 15 clusters has the highest value for the silhouette width. In some embodiments, determining equipment instance(s) 214 may involve inputting an initial number of points to include in a cluster. The initial number of points to include in a cluster may be 7 points. In some embodiments, the initial number of points to include in a cluster may be at least 3 points, at least 5 points, at least 7 points, or at least 10 points. FIG. 20 is a box plot illustrating cluster purity achieved using techniques described herein to determine clusters of points corresponding to equipment instances. In particular, FIG. 20 shows cluster purity data for a Partition Around Medoids (PAM) clustering technique and a Dictionary-Search technique that involves using numeric values following an acronym as an input feature.

In some embodiments, text-based statistical model(s) 702 may include a hierarchical classifier. The hierarchical classifier may include multiple classifiers having a hierarchical configuration where an output from a classifier from a first level is provided as input to one or more classifiers in a second level. A classifier in the first level may be used in determining whether text data 202 is associated with a main class of pieces of equipment (e.g., fans, meters). A classifier in the second level may be used in determining whether an output from the first level is as specific class within the main class associated with the output. An output from the model may identify both the main class and specific class for text data 202.

Some embodiments involve using a hierarchical classifier in determining equipment type(s) 212 using text data 202. For example, text-based statistical model(s) 702 may include in the first level a first classifier for fans, a second classifier for meters, a third classifier for chillers, and a fourth classifier for pumps. In the second level, the statistical model(s) 702 may include a first set of classifiers that receive an output from the first classifier, a second set of classifiers that receive an output from the second classifier, a third set of classifiers that receive an output from the third classifier, and a fourth set of classifiers that receive an output from the fourth classifier. The first set of classifiers may include a classifier for each of supply fan, exhaust fan, return fan, and relief fan. The second set of classifiers may include a classifier for each of electric meter, water meter, steam meter, and gas meter. The third set of classifiers may include a classifier for each of absorption chiller, centrifugal chiller, reciprocal chiller, and screw chiller. The fourth set of classifiers may include a classifier for each of chilled water pump, circulation pump, domestic water pump, dual temperature water pump, glycol pump, hot water pump, and condenser water pump.

The outputs from classifiers in the second level may be used in determining an equipment type(s) 212 for text data 202. In some embodiments, an output from a classifier in the second level may include one or more values indicating probability that text data 202 is likely to be the specific class type associated with the classifier. Determining equipment type(s) 212 may involve selecting a specific class type from among multiple specific class types based on the values associated with the outputs from classifiers for the multiple specific class types. In some embodiments, selecting the specific class type for text data 202 may involve selecting the specific class type having the highest probability among the multiple specific class types.

In some embodiments, text-based statistical model(s) 702 may include at least 10, at least 15, at least 20, at least 25, or at least 30 classifiers in the first level for different main classes of equipment. Examples of main class types include air handling unit, battery, boiler, chilled water plant, chiller, computer room air conditioner, condenser, constant air volume, cooling tower, duct heater, electrical panel, elevator, evaporator, fan, fan coil unit, fume hood, heat exchanger, heat pump, hot water plant, lighting system, meter, pump, radiant system, site sensors, tank, unit ventilator, variable air volume, and variable refrigerator flow.

In some embodiments, text-based statistical model(s) 702 may include at least 1, at least 2, at least 3, at least 4, at least 5, or at least 6, or at least 7 classifiers in the second level for different specific classes of a single main class. Examples of specific class types included within the main class of air handling unit include energy recovery ventilation unit, make up air unit, and roof top unit. Examples of specific class types included within the main class of boiler include hot water boiler and steam boiler. Examples of specific class types included within the main class of chiller include absorption chiller, centrifugal chiller, reciprocal chiller, and screw chiller. Examples of specific class types included within the main class of electrical panel include site panel and sub panel. Examples of specific class types included within the main class of fan include exhaust fan, relief fan, return fan, supply fan, booster fan, and cooling tower fan. Examples of specific class types included within the main class of meter include electric meter load, gas meter load, steam meter load, and water meter load. Examples of specific class types included within the main class of pump include chilled water pump, circulation pump, domestic water pump, dual temperature water pump, glycol pump, hot water pump, and condenser water pump. Examples of specific class types included within the main class of radiant system include chilled beam, radiant floor, and radiator. An example of a specific class type included within the main class of variable air volume is exhaust air variable air volume.

Text data 202 may include text values for different attributes for individual points. For example, the point corresponding to the first row of text data shown in FIG. 8 has a text value of "Office 0001 01-13" for the attribute "Network Device", a text value of "A1:1" for the attribute "Object ID", a text value of "VAV FL/Flow Input" for the attribute of "Name", a text value of "flow_input_1" for the attribute "Description", a text value of "7" for the attribute "Unit", and a text value of "cfm" for the attribute "Value". In the context of determining equipment instance for individual points, a group of points that share the same or similar text values for one or more attributes of the text data may be considered as an equipment instance. For example, the first four points in FIG. 8 have the same text value ("Office 001 VAV001 01-13") for the attribute "Network Device". In addition, the middle four points in FIG. 8 have the same text value ("Office 005 VAV005 01-10") for the attribute "Network Device". The last four points in FIG. 8 also have the same text value ("Corridor VAVQ006 01-18") for the attribute "Network Device". In this example, these text values for the attribute "Network Device" may be extracted from text data 202 and provided as an input to text-based statistical model(s) 702 to obtain an output indicating equipment instances for these points.

Some embodiments may involve extracting text values corresponding to one or more attributes of text data 202 and using the extracted text as an input to text-based statistical model(s) 702. In such embodiments, extracting text values from the one or more attributes for a point may involve removing punctuation in text values to generate filtered text, and using the filtered text as an input to text-based statistical model(s) 702. Removing punctuation to generate filtered text may involve removing spaces, periods, hyphens, underscores, colons, semi-colons, slashes, or any other types of punctuation present in text data 202. For example, the text value of "Office 0001 01-13" may be filtered by removing the spaces and hyphen to become "Office00010113" as the filtered text. In some embodiments, removing punctuation to generate filtered text may involve changing capitalized letters to lower case letters in text data 202. Using the above example, "Office 0001 01-13" may be filtered change the capital letter ("O") to a lower case letter ("o") and become "office 0001 01-13". In some embodiments, extracting text values from the one or more attributes for a point may involve removing a special character (e.g., "@", "%", "#", "*") to generate filtered text.

In some embodiments, extracting text from text data 202 may include extracting one or more acronyms from text values for one or more attributes of text data 202. A natural language dictionary relating common equipment specific acronyms may be sued in extracting the one or more acronyms. Examples of equipment specific acronyms include "vav", "fcu", and "rtu" for the terms "variable-air volume", "fan coil unit", and "roof-top unit", respectively.

In some embodiments, extracting text from text data 202 may include extracting a numeric suffix for data corresponding to point(s) and providing the numeric suffix as an input to text-based statistical model(s) 702 in determining equipment instances for the point(s). Extracting the numeric suffix may involve using a regex function. In some instances, the numeric suffix may occur in text data 202 after a hyphen ("-"). For example, in FIG. 8 the first four rows have the numeric suffix "13" in the attribute "Network Device". The middle four rows have the numeric suffix "10" in the attribute "Network Device". The last four rows have the numeric suffix "18" in the attribute "Network Device." In this example, the numeric suffixes may be extracted from the text value for the attribute "Network Device" and provided as an input to text-based statistical model(s) 702 to obtain an output indicating equipment instances for these points. In some embodiments, extracting a numeric suffix from text data 202 may involve extracting a numeric suffix following an acronym (e.g., vav, fcu, rtu). For example, text data 202 may have as a text value "rtu 3". Extracting a numeric suffix may involve extracting the number "3" from the text value since it follows the acronym "rtu".

Some embodiments involve using a natural language dictionary to modify text values corresponding to attributes of the text data to generate modified text values and providing the modified text values as input to text-based statistical model(s) 702. The natural language dictionary may relate terms for different types of equipment to shorthand versions (e.g., acronyms) of the terms. In some embodiments, the natural language dictionary may also include common terms to use when a group of terms are related in having the same or similar meaning. Modifying the text values may include replacing a term in the text values with a common term based on the natural language dictionary. For example, the acronyms "temp stpt" and "tmp spt" may both refer to a "temperature setpoint." The natural language dictionary may be used to replace instances of "temp stpt" and "tmp spt" in text data to "temperature setpoint." As another example, the acronyms "oad" and "oadmpr" may both refer to a "outside air damper." The natural language dictionary may be used to replace instances of "oad" and "oadmpr" in text data to "outside air damper."

Some embodiments involve constructing the natural language dictionary using terminology associated with building control networks. The terminology may be extracted from unstructured data sources, including webpages, articles, and manuals. The unstructured data sources may include data sources from different suppliers of building automation equipment. Constructing the natural language dictionary may relate terms for different types of building automation equipment to shorthand versions (e.g., acronyms) of the terms. In some embodiments, the unstructured data sources may include webpages associated with some or all of the different suppliers. In such embodiments, extracting the terminology may involve using a web scraping process.

In some embodiments, feature(s) of the natural language dictionary may be used in training a statistical model described herein, such as statistical model 114 and text-based statistical model(s) 702. Such embodiments may involve determining the feature(s) of the terms included in the natural language dictionary and using the feature(s) in training the statistical model. In some embodiments, determining the feature(s) of the terms involves determining one or more term frequency-inverse document frequency (TF-IDF) values associated with individual terms in the natural language dictionary.

Figure 9:
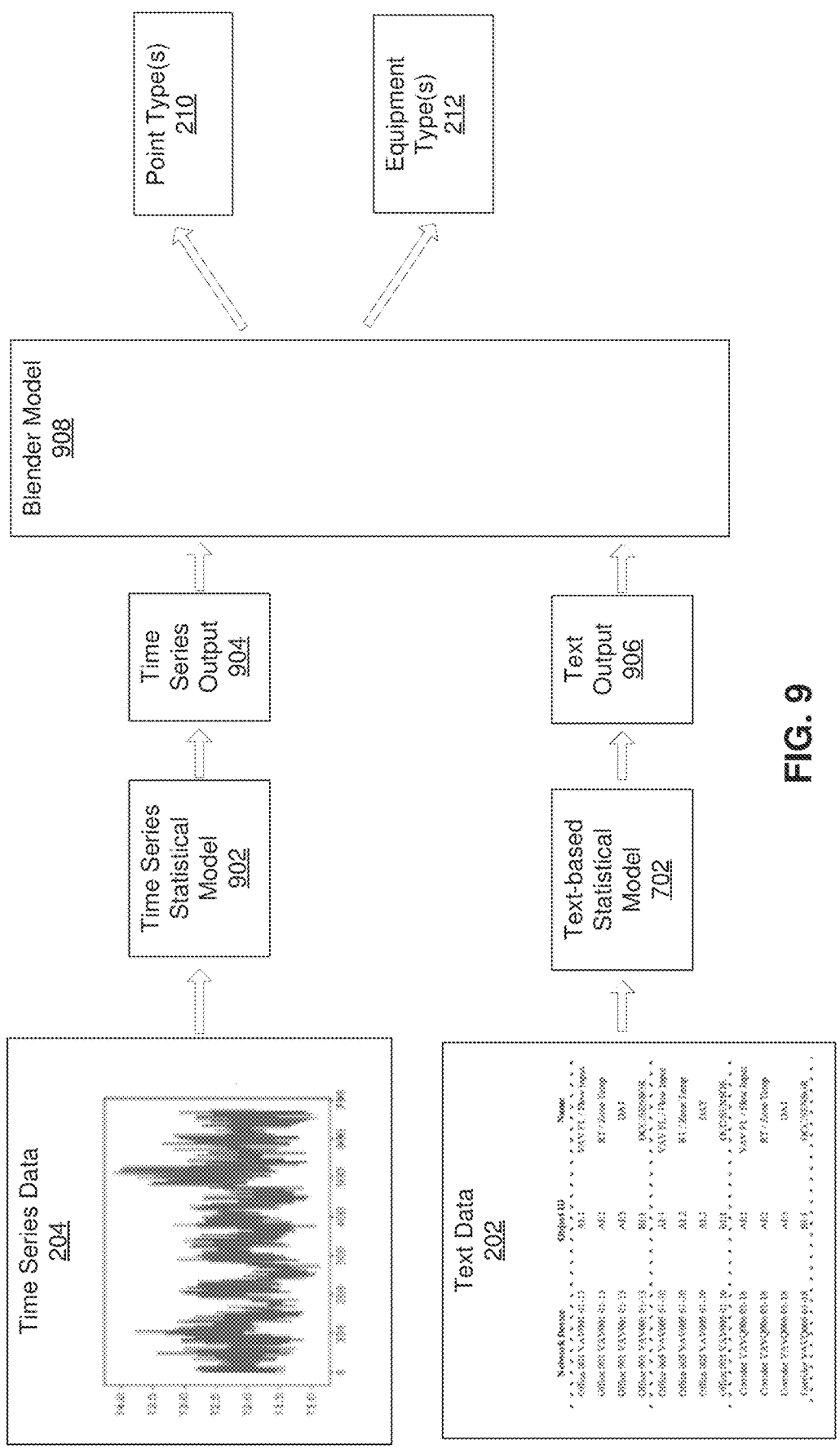
FIG. 9 is a schematic of an illustrative process for determining point type(s) and equipment type(s) using time series data as input to a time series statistical model and text data as input to a text-based statistical model, in accordance with some embodiments of the technology described herein.

FIG. 9 is a schematic of an illustrative process for determining point type(s) and equipment type(s) using time series data as input to a time series statistical model and text data as input to a text-based statistical model. As shown in FIG. 9, time series data 204 may be provided as an input to time series statistical model 902, which may include one or more of statistical models discussed in connection with FIGS. 2, 3A, 3B, 3C and 6, to obtain time series output 904. Text data 202 may be provided as input to text-based statistical model 702 to obtain text output 906. Time series output 904 and text output 906 may be provided as inputs to blender model 908 to obtain point type(s) 210 and equipment type(s) 212.

Blender model 908 may include one or more classifiers. Blender model 908 may output predictions indicating whether a combination of time series data 204 and text data 202 is categorized as being particular point types and/or equipment types. In some embodiments, blender model 908 is a machine learning classifier. Examples of machine learning classifiers that may be included in blender model 908 include a support vector classifier, a logistic regression classifier, and a random forest classifier. In some embodiments, blender model 908 is a rule-based classifier. Examples of rule-based classifiers that may be included in blender model 908 include a majority voting classifier and a weighted majority classifier.

Figure 10A:
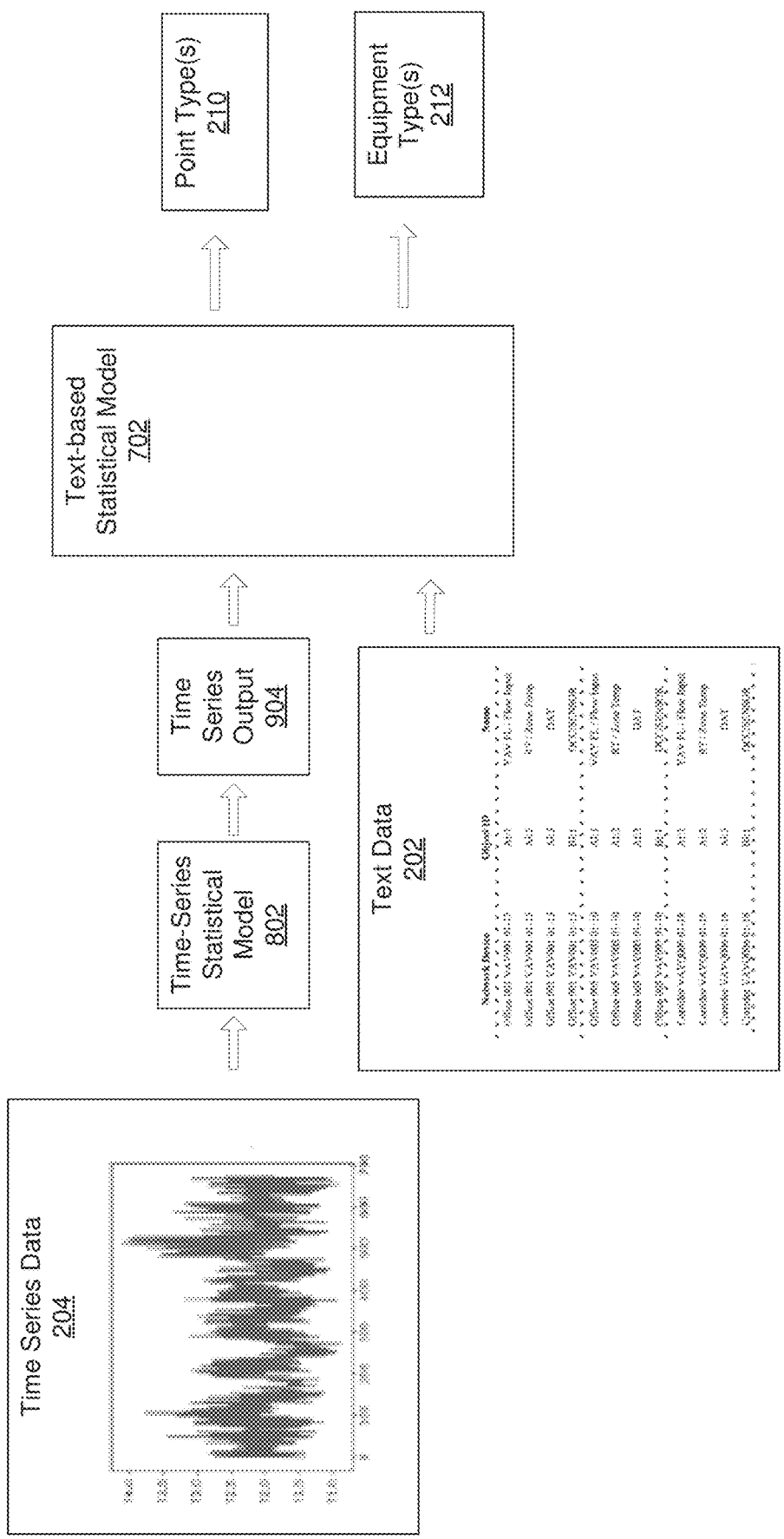
FIGS. 10A and 10B are schematics of illustrative processes for determining point type(s) and equipment type(s) using a hierarchical structure of a time series statistical model and a text-based statistical model, in accordance with some embodiments of the technology described herein.
Figure 10B:
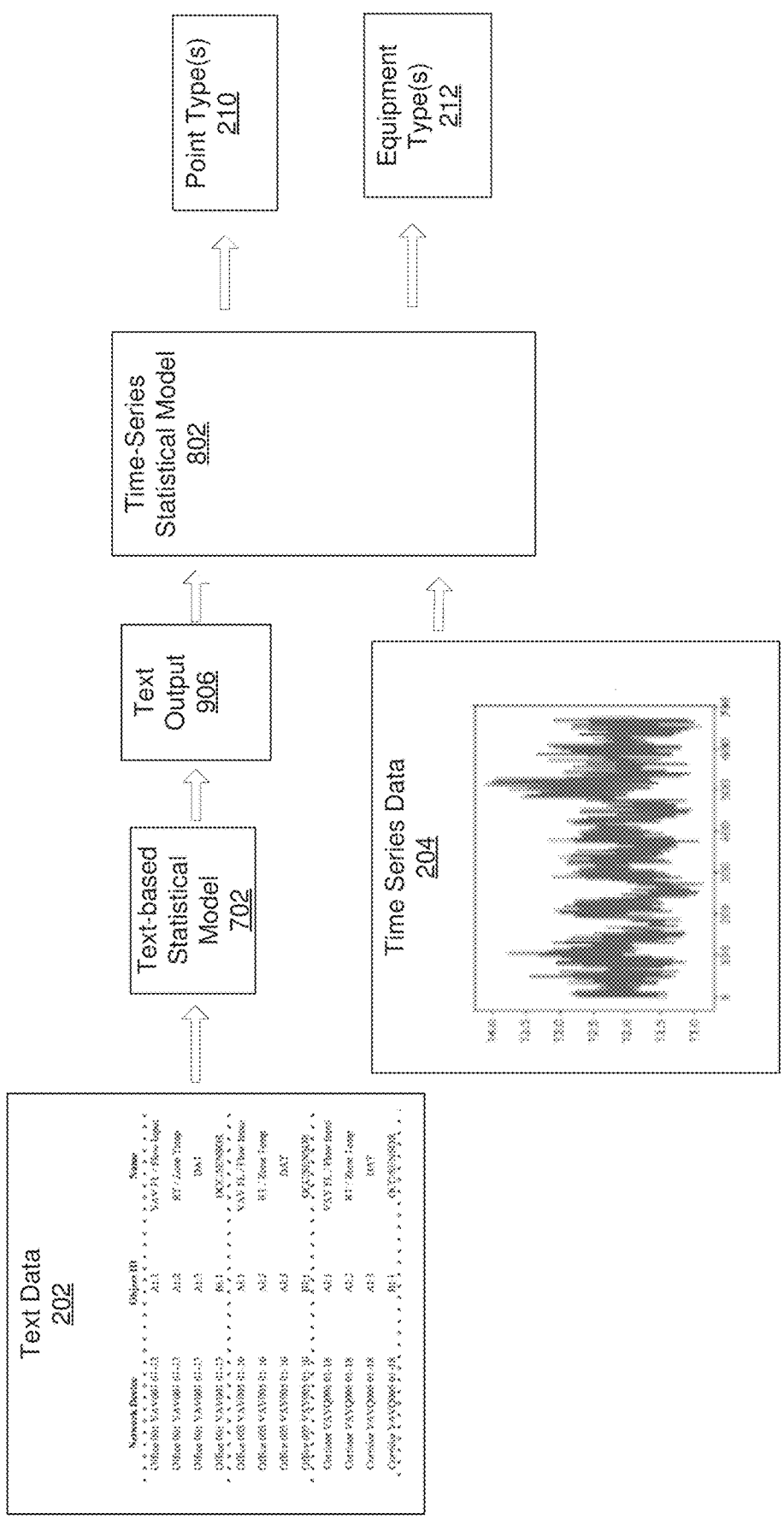

Some embodiments involve a hierarchical structure of a time-series statistical model and a text-based statistical model. FIGS. 10A and 10B are schematics of illustrative processes for determining point type(s) and equipment type(s) using a hierarchical structure of a time series statistical model and a text-based statistical model. As shown in FIG. 10A, time series data 204 may be provided as input to time-series statistical model 802 to obtain time series output 904. Text data 202 and time series output 904 may be provided as input to text-based statistical model 702 to obtain point type(s) 210 and equipment type(s) 212. As shown in FIG. 10B, text data 202 may be provided as input to text-based statistical model 702 to obtain text output 906. Time series data 204 and text output 906 may be provided as input to time-series statistical model 802 to obtain point type(s) 210 and equipment type(s) 212.

Some embodiments involve determining operational relationships between equipment instances. Returning to FIG. 2, time series data 204 may be provided as input to statistical model 114 to obtain an output indicating equipment relationship(s) 216, which may include operational relationships between two or more pieces of equipment. Time series data 204 may include data associated with points in different equipment instances and this data may be used in determining an operational relationship between pieces of equipment associated with these different equipment instances. In some embodiments, determining an operational relationship may involve obtaining first time series data associated with a first piece of equipment and second time series data associated with a second piece of equipment. The first time series data, the second time series data, and statistical model 114 may be used to determine an operational relationship between the first piece of equipment and the second piece of equipment.

Figure 21:
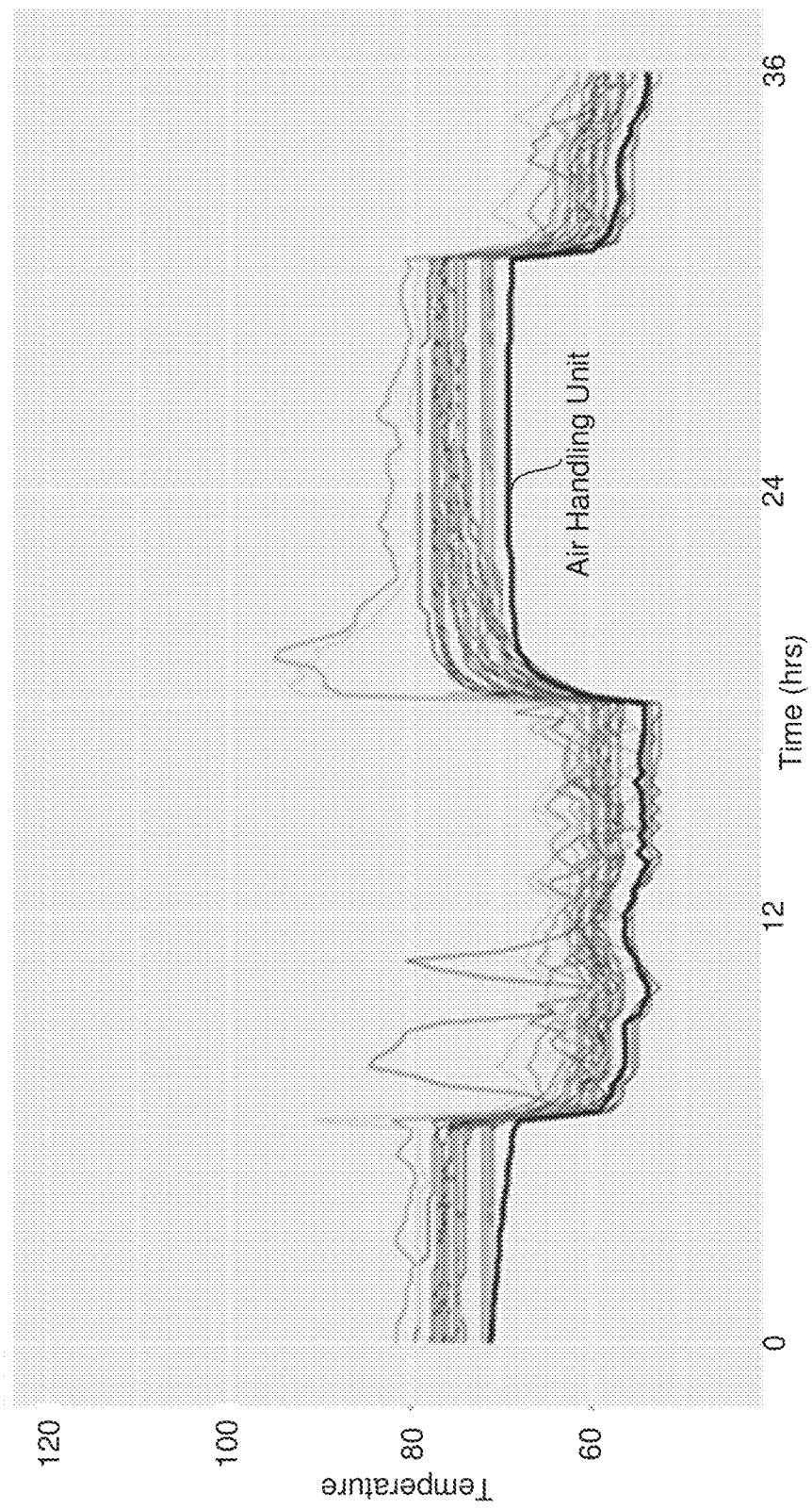
FIG. 21 is a plot of raw time series data for discharge air temperature for an air handling unit (shown in bold) and discharge air temperature for multiple variable-air-volume boxes, in accordance with some embodiments of the technology described herein.

An operational relationship may include a relative functional relationship between the first piece of equipment and the second piece of equipment. As an example, the first piece of equipment may be an air handling unit and the second piece of equipment may be a variable-air-volume box. An operational relationship may include a relative positioning of the air handling unit as being downstream to the variable-air-volume box. The first data may correspond to one or more points associated with the first piece of equipment. Similarly, the second data may correspond to one or more points associated with the second piece of equipment. For example, the first data may correspond to a supply fan speed of an air handling unit and the second data may correspond to discharge air flow of a variable-air-volume box. As another example, the first data may correspond to discharge air temperature of an air handling unit and the second data may correspond to discharge air flow of a variable-air-volume box. FIG. 21 is a plot of raw time series data for discharge air temperature for an air handling unit (shown in bold) and discharge air temperature for multiple variable-air-volume boxes.

In some embodiments, a statistical model used for determining operational relationships may include a binary classifier. In such embodiments, an output of the statistical model may include a prediction indicating that a particular set of one or more equipment instances as being categorized as having an operational relationship. Example classifiers that may be used in the statistical model include a support vector machine classifier, a logistic regression classifier, a gradient boosted classifier, a decision tree classifier, a Bayesian classifier, a network Bayesian classifier, a neural network classifier, and a random forest classifier.

Some embodiments may involve determining statistical values for one or more time windows of the first data and the second data. A combination of statistical values for the first data and statistical values for the second data may be used as input to the statistical model. Examples of statistical values that may be determined for a time window of time series data include a minimum value, a maximum value, a mean value, a median value, a standard deviation value, $5^{th}$ percentile value, $25^{th}$ percentile value, $33^{rd}$ percentile value, $66^{th}$ percentile value, $75^{th}$ percentile value, and $95^{th}$ percentile value.

In some embodiments, the one or more time windows of the first data and the second data may be selected based on diurnal occupancy patterns in the building. For example, a time window corresponding to a period of time during the day may be a first time window and a time window corresponding to a period of time during the night may be a second time window that may be determined based on diurnal occupancy patterns in the building. Statistical value(s) may be obtained for the first data in both the first time window and the second time window. In addition, statistical value(s) may be obtained for the second data in both the first time window and the second time window. In some embodiments, a difference between a statistical value for the first data and a statistical value for the second data may be obtained both within the first time window and the second time window to obtain a first difference value and a second difference value, respectively. The first difference value and the second difference value may be provided as inputs to the statistical model to obtain an output indicating whether an operational relationship exists.

In some embodiments, determining an operational relationship may include performing a correlation process on a portion of the first data and a portion of the second data and using an output of the correlation process as input to the at least one trained statistical model. The correlation process may include a cross-correlation process, and an output of the cross-correlation process may be used as input to the at least one trained statistical model. In some embodiments, the output of the cross-correlation process is a time associated with a cross-correlation value.

Table 1 below illustrates equipment relationship accuracy results comparing different types of classifiers used for determining operational relationships between air handling units (AHUs) and variable-air-volume (VAV) boxes an example data set. In particular, Table 1 illustrates different combinations of point types used in determining these operational relationships. In particular, one combination is the discharge air temperature of air handling units and the discharge air temperature of the variable-air-volume boxes. Another combination shown in Table 1 is the supply fan speed of the air handling units and the discharge air flow of the variable-air-volume boxes. The different types of classifiers used in analyzing this data is a logistic regression classifier, a support vector machine classifier, and a gradient boosted classifier. The percentages shown in Table 1 compare these classifiers to the actual labels obtained by a person examining the corresponding data to infer whether an operational relationship exists or not and comparing those results to actual information, such as obtained from mechanical drawings. For the baseline values shown below, these were obtained by determining whether an operational relationship exists between different pairs of an air handling unit and a variable-air-volume box by computing cross-correlations between the different pairs and selecting the maximum cross-correlation value and comparing to results to these actual labels. In this way, the performance of different types of classifiers may be compared to conventional techniques for determining operational relationships. In addition, Table 1 shows combined results using both discharge air temperature data and supply fan speed data for the air handling units and discharge air temperature and discharge air flow for the variable-air-volume boxes for the baseline analysis and each of the different classifiers used. These results illustrate the ability for the machine learning techniques described herein to determine operational relationships with the same or better, in some instances, than a baseline analysis.

TABLE 1

Equipment Relationship Results

| | Discharge Air Temperature (AHU) & Discharge Air Temperature (VAV) | Supply Fan Speed (AHU) & Discharge Air Flow (VAV) | Combined Results |
|---|---|---|---|
| Baseline | 62.30% | 62.40% | 78.50% |
| Logistic Regression | 66.40% | 63.80% | 79.40% |

TABLE 1-continued

Equipment Relationship Results

| | Discharge Air Temperature (AHU) & Discharge Air Temperature (VAV) | Supply Fan Speed (AHU) & Discharge Air Flow (VAV) | Combined Results |
|---|---|---|---|
| Classifier Support Vector Machine (SVM) Classifier | 64.50% | 57.60% | 78.80% |
| Gradient Boosted Classifier | 64.90% | 65.30% | 76.10% |

Figure 11:
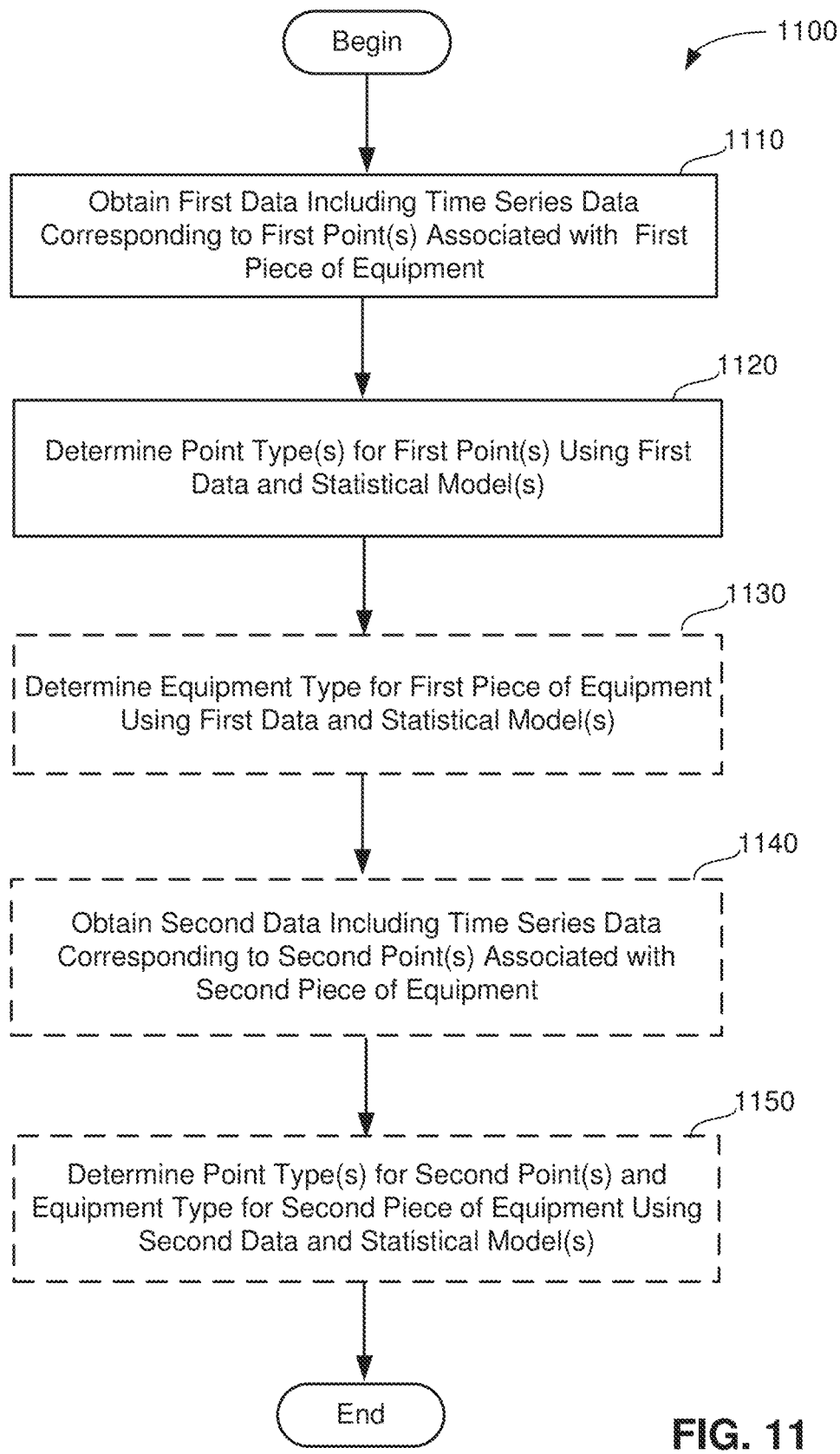
FIG. 11 is a flow chart of an illustrative process for determining point type(s) for point(s) associated with a piece of equipment located at a building controlled by a building control network using data obtained for the piece of equipment and statistical model(s), in accordance with some embodiments of the technology described herein.

FIG. 11 is a flow chart of an illustrative process 1100 for determining point type(s) for point(s) associated with a piece of equipment located at a building controlled by a building control network using data obtained for the piece of equipment and statistical model(s), in accordance with some embodiments of the technology described herein. Process 1100 may be performed on any suitable computing device(s) (e.g., a single computing device, multiple computing devices co-located in a single physical location or located in multiple physical locations remote from one another, one or more computing devices part of a cloud computing system, etc.), as aspects of the technology described herein are not limited in this respect. In some embodiments, statistical model(s) 114 may perform some or all of process 1100 to determine point type(s).

Process 1100 begins at act 1110, where first data for a first piece of equipment located at a building controlled by a building control network is obtained. The first data includes time series data corresponding to first point(s) associated with the first piece of equipment.

Next, process 1100 proceeds to act 1120, where point type(s) for the first point(s) is determined using the first data and statistical model(s), such as by using statistical model(s) 114. The statistical model(s) may be trained using training data indicating multiple point types and multiple equipment types for different pieces of equipment. Determining the point type(s) may involve providing the first data as an input to the statistical model(s) and obtaining an output indicating the point type(s). The point type(s) may include one or more point types selected from a sensor, an actuator, a setpoint, and an alarm.

In some embodiments, process 1100 may proceed to act 1130, where an equipment type for the first piece of equipment is determined using the first data and the statistical model(s). Determining the equipment type may involve providing the first data as an input to the statistical model(s) and obtaining an output indicating the equipment type. The equipment type may include one selected from an air handling unit, a variable-air-volume box, a boiler, a chiller, a fan, a filter, and a thermostat.

In some embodiments, process 1100 may proceed to act 1140, where second data for a second piece of equipment located at the building controlled by the building control network is obtained. The second data includes time series data corresponding to second point(s) associated with the second piece of equipment. In such embodiments, process 1100 may proceed to act 1150, where point type(s) for the second point(s) and equipment type for the second piece of equipment are determined using the second data and the statistical model(s).

In some embodiments, the statistical model(s) includes an encoder. Determining the point type(s) for the first point(s) at act 1120 may involve determining, using the encoder and the first data, feature(s) of the first data. Using the encoder may involve providing the first data as an input to the encoder and obtain an output indicating the feature(s) of the first data. The feature(s) may include one or more selected from a mean value for the first data, a median value for the first data, a standard deviation value for the first data, a kurtosis value for the first data, a skewness value for the first data, a minimum value for the first data, a maximum value for the first data, a median absolute deviation value for the first data, a mean absolute deviation value for the first data, and an interquartile range value for the first data, an auto-correlation value for the first data.

In some embodiments, the first data corresponds to one point, and the feature(s) of the first data includes a correlation value between the first data and second data corresponding to another point. In some embodiments, the feature(s) of the first data includes a percentage of data values in the first data containing a decimal point. In some embodiments, the feature(s) of the first data includes a ratio of consecutive data values in the first data that are substantially similar to a total number of data values in the first data. In some embodiments, the feature(s) of the first data includes a correlation value between the time-series data of the first data and outdoor temperature for a location of the building. In some embodiments, the feature(s) of the first data includes one or more amplitudes of Fourier harmonic(s) of the first data. In some embodiments, the feature(s) of the first data includes one or more frequencies corresponding to Fourier harmonic(s) of the first data.

In some embodiments, the statistical model(s) used includes classifier(s). Determining the point type(s) for the first point(s) at act 1120 may involve determining, using the classifier(s) and the feature(s), the point type(s) for the first point(s). Using the classifier(s) may involve providing the feature(s) as an input to the classifier(s) and obtaining an output indicating the point type(s). In some embodiments, the output includes values corresponding to multiple point types. Determining the point type(s) at act 1120 may involve selecting, based on the values corresponding to the multiple point types, the point type(s) for the first point(s) from among the multiple point types.

In some embodiments, the output includes values corresponding to multiple equipment types. Determining an equipment type for the first piece of equipment at act 1130 may involve selecting, based on the values corresponding to the multiple equipment types, the equipment type for the first piece of equipment from among the multiple equipment types.

Examples of classifiers that the statistical model(s) may include are a support vector machine classifier, a logistic regression classifier, a gradient boosted classifier, a decision tree classifier, a Bayesian classifier, a Bayesian network classifier, a random forest classifier, a k-nearest neighbors classifier, a neural network classifier, and an extremely randomized trees classifier.

In some embodiments, the statistical model(s) may include one or more neural networks. The one or more neural networks may include a 1-dimensional convolutional neural network. Determining the point type(s) for the first point(s) at act 1120 may involve providing the first data as an input to the one or more neural networks and obtaining an output indicating the point type(s) as an output. Similarly, determining the equipment type for the first piece of equipment at act 1130 may involve providing the first data as an input to the one or more neural networks and obtaining an output indicating the equipment type as an output.

Some embodiments involve performing a normalization process on the first data to obtain normalized first data. Determining the point type(s) for the first point(s) further comprises providing the normalized first data as an input to the neural network(s) and obtaining an output indicating the point type(s) as an output. Determining equipment type for the first piece of equipment further comprises providing the normalized first data as an input to the neural network(s) and obtaining an output indicating the equipment type(s) as an output.

In some embodiments, process 1100 may further include training the neural network(s) using the training data where the training involves performing layer normalization. As an example, layer normalization may involve computing mean (s) and variance(s) from inputs to a layer. An example layer normalization process is described in "Layer Normalization" by Jimmy L. Ba, Jamie R. Kiros, and Geoffrey E. Hinton (arxiv.org/abs/1607.06450), which is incorporated by reference herein in its entirety. Some embodiments may involve applying a multidimensional transformation process to the first data to obtain transformed first data. In some embodiments, the transformed first data includes a multidimensional matrix. In some embodiments, the multidimensional transformation process is a geometrical transformation process. In some embodiments, the multidimensional transformation process is a probabilistic transformation process. Determining the point type(s) for the first point(s) may include providing the transformed first data as an input to the neural network(s) and obtaining an output indicating the point type(s) as an output. Determining the equipment type for the first piece of equipment may include providing the transformed first data as an input to the neural network(s) and obtaining an output indicating the equipment type as an output.

In some embodiments, the first data includes text data corresponding to the first point(s) associated with the first piece of equipment. The statistical model(s) may include a first statistical model and a second statistical model. Process 1100 may further include providing the time series data as an input to the first statistical model to obtain a first output, providing the text data as an input to the second statistical model to obtain a second output, and determining, using the first output and the second output, the point type(s) for the first point(s). Determining the equipment type for the first piece of equipment may involve using the first output and the second output.

In some embodiments, the statistical model(s) may include a third statistical model. Determining the point type(s) for the first point(s) may include providing the first output and the second output as inputs to the third statistical model to obtain an output indicating the point type(s). Determining the equipment type for the first piece of equipment may involve providing the first output and the second output as inputs to the third statistical model to obtain an output indicating the equipment type.

Figure 12:
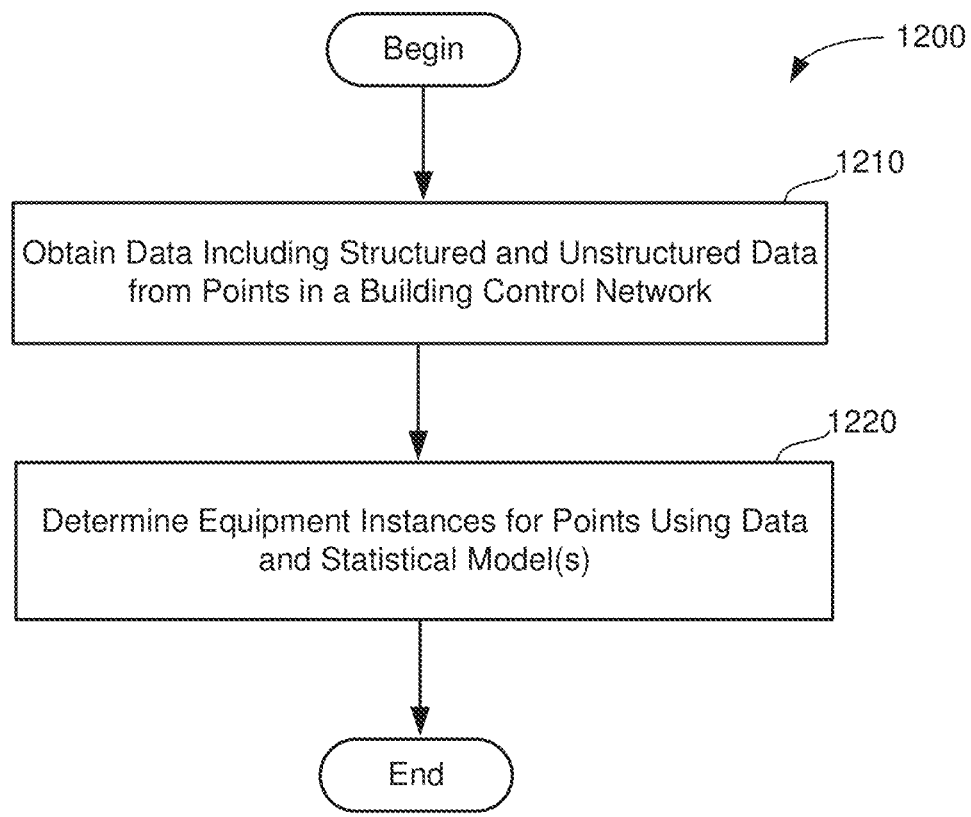
FIG. 12 is a flow chart of an illustrative process for equipment instances for points associated with a piece of equipment located at a building controlled by a building control network using data obtained for the piece of equipment and statistical model(s), in accordance with some embodiments of the technology described herein.

FIG. 12 is a flow chart of an illustrative process 1200 for determining equipment instances for points associated with a piece of equipment located at a building controlled by a building control network using data obtained for the piece of equipment and trained statistical model(s), in accordance with some embodiments of the technology described herein. Process 1200 may be performed on any suitable computing device(s) (e.g., a single computing device, multiple computing devices co-located in a single physical location or located in multiple physical locations remote from one another, one or more computing devices part of a cloud computing system, etc.), as aspects of the technology described herein are not limited in this respect. In some embodiments, statistical model(s) 114 may perform some or all of process 1200 to determine equipment instances.

Process 1200 begins at act 1210, where data from points in a building control network for a building is obtained. The data may include structured data and unstructured data. In some embodiments, the data may include rows corresponding to individual points in the building control network.

Next, process 1200 proceeds to act 1220, where equipment instances for the points are determined using the data and statistical model(s). Each of the equipment instances identifies an equipment node for a group of points in the building control network. Determining the equipment instances may involve using text identified from the data as input to the statistical model(s). In embodiments where the data includes rows corresponding to individual points in the building control network, act 1220 may include using row information as input to the statistical model(s).

A statistical model used in determining equipment instances at act 1220 may involve selecting a statistical model from among multiple statistical models based on one or more statistical values associated with results obtained when using the data and each of the multiple statistical models. The selected statistical model may be used in determining the equipment instances at act 1220. In some embodiments, this selection of a statistical model from among multiple statistical models may be performed for individual buildings. For example, a first statistical model may be selected for a first building and a second statistical model may be used for a second building. In this way, determining equipment instances for different buildings may involve using different statistical models.

In some embodiments, the statistical model may include multiple clustering-based classifiers and determining the equipment instances may involve selecting one of the multiple clustering-based classifiers to use in determining the equipment instances. Examples of clustering-based classifiers include a Partitioning Around Medoids (PAM) clustering classifier, k-means clustering classifier, and k-medoids clustering classifier. Selecting one of the multiple clustering-based classifiers may involve calculating a statistical value for each of the clustering-based classifiers and selecting one of the clustering-based classifiers based on the statistical values. In some embodiments, the statistical values may include silhouette width values calculated for the multiple clustering-based classifiers. A silhouette width is a measure of how similar an object is to its own cluster compared to other clusters. A clustering-based classifier having the highest silhouette width may be used in determining the equipment instances at act 1220.

The statistical model may include one or more clustering-based classifiers. In some embodiments, an initial number of clusters may be determined and provided as input to the one or more clustering-based classifiers. The initial number of clusters may depend on an initial number of points associated with a cluster. For example, the initial number of points associated with a cluster may be 3, 5, 7, or 10. The initial number of clusters may be determined by dividing the total number of points by the initial number of points associated with a cluster. In some embodiments, multiple values for the initial number of points associated with a cluster may be used as part of determining the equipment instances. In such embodiments, a clustering process may be performed multiple times, each using different initial numbers of points associated with a cluster.

In some embodiments, determining the equipment instances may involve determining a group of points for an equipment instance that includes points in the building control network having different point types. The different point types may include two or more of: a sensor, an actuator, a setpoint, and an alarm.

In some embodiments, the data obtained at act 1210 may include text values for attributes of individual points in the building control network. In such embodiments, determining the equipment instances at act 1220 may involve using text extracted from the text values as input to the statistical model(s). In some embodiments, process 1200 may include extracting text values from attributes for a point in the building control network, removing punctuation in the text values to generate filtered text, and using the filtered text as input to the statistical model(s). In embodiments that involve using a clustering process, the filtered text may be used as a feature in the clustering process. The filter text may include network device text, acronym(s), or other text strings obtained from the data. In some embodiments, process 1200 may include identifying an acronym in the text values for the attributes, determining, using a natural language dictionary, a word corresponding to the acronym, and replacing the acronym in the text values with the word.

In some embodiments, determining the equipment instances at act 1120 may involve using point type(s) and/or equipment type(s) identified for the points in the building. The point type(s) and/or equipment type(s) may be identified using the techniques described herein, such as process 1100 shown in FIG. 11. The point type(s) and/or equipment type(s) may be provided as input to the statistical model(s). In embodiments that involve using a clustering process, the point type(s) and/or equipment type(s) may be used as a feature in the clustering process.

In some embodiments, determining the equipment instances at act 1220 may involve identifying integer row numbers from the data. For example, integer row numbers from structured data may be extracted and included as a list of row numbers (e.g., 1, 2, 3, 4, etc.) These row numbers may provided as input to the statistical model(s). In embodiments that involve using a clustering process, the row numbers may be used as a feature in the clustering process.

Some embodiments involve using multiple features as input to the statistical model(s). For example, integer row numbers, point type(s), network device text, and acronyms extracted from the data may be provided as input to the statistical model(s). In embodiments that involve using a clustering process to determine equipment instances, integer row numbers, point type(s), network device text, and acronyms extracted from the data may be used as features in the clustering process.

In some embodiments, determining equipment instances at act 1220 may involve calculating similarity and/or dissimilarity matrices that compare individual rows with one another, such as rows of data in a relational database. The similarity and/or dissimilarity matrices may include information comparing every row to every other row in the data. In embodiments that involve using a clustering process to determine equipment instances, the similarity and/or dissimilarity matrices may be used in determining the equipment instances. For example, the similarity and/or dissimilarity matrices may include values identifying relative differences between different rows in the data. These values may be used as features in the clustering process. In some embodiments, edges between rows may be determined by providing similarity and/or dissimilarity matrices as input to the clustering process.

Figure 13:
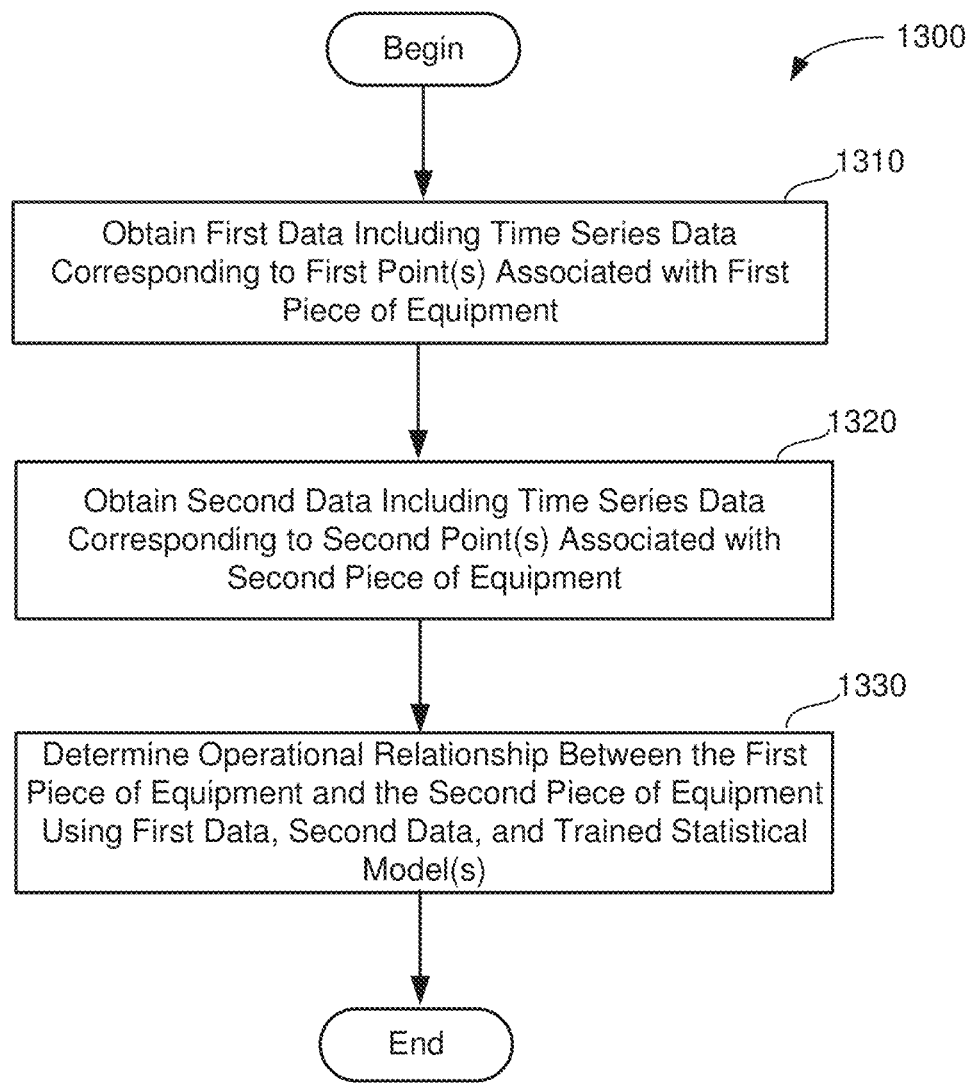
FIG. 13 is a flow chart of an illustrative process for determining an operational relationship between different pieces of equipment in a building controlled by a building control network using data obtained for the pieces of equipment and trained statistical model(s), in accordance with some embodiments of the technology described herein.

FIG. 13 is a flow chart of an illustrative process 1300 for determining an operational relationship between different pieces of equipment in a building controlled by a building control network using data obtained for the pieces of equipment and trained statistical model(s), in accordance with some embodiments of the technology described herein. Process 400 may be performed on any suitable computing device(s) (e.g., a single computing device, multiple computing devices co-located in a single physical location or located in multiple physical locations remote from one another, one or more computing devices part of a cloud computing system, etc.), as aspects of the technology described herein are not limited in this respect. In some embodiments, statistical model(s) 114 may perform some or all of process 1300 to determine an operational relationship between different pieces of equipment.

Process 1300 begins at act 1310, where first data from a building control network associated with a first piece of equipment in a building is obtained. The first data may include time series data corresponding to different points associated with the first piece of equipment.

Next, process 1300 proceeds to act 1320, where second data from a building control network associated with a second piece of equipment in a building is obtained. The second data may include time series data corresponding to different points associated with the second piece of equipment.

Next, process 1300 proceeds to act 1330, where an operational relationship between the first piece of equipment and the second piece of equipment is determined using the first data, the second data, and trained statistical model(s). In some embodiments, the first piece of equipment is an air handling unit and the second piece of equipment is a variable-air-volume box. The first data may correspond to a supply fan and the second data may correspond to discharge air.

The trained statistical model(s) may include one or more classifiers selected from: a support vector machine classifier, a logistic regression classifier, a gradient boosted classifier, a decision tree classifier, a Bayesian classifier, a Bayesian network classifier, a neural network classifier, and a random forest classifier. In some embodiments, trained statistical model(s) includes one or more neural networks.

In some embodiments, process 1300 further includes selecting, based on a type of the first piece of equipment, a portion of the first data for a first point associated with the first piece of equipment having a first point type and selecting, based on a type of the second piece of equipment, a portion of the second data for a second point associated with the second piece of equipment having a second point type. Determining the operational relationship between the first piece of equipment and the second piece of equipment at act 1330 may involve using the portion of the first data, the portion of the second data, and the trained statistical model(s).

In some embodiments, process 1300 may include performing a correlation process on the portion of the first data and the portion of the second data. An output of the correlation process may be used as input to the trained statistical model(s). In some embodiments, the correlation process is a cross-correlation process, and an output of the cross-correlation process is used as input to the trained statistical model(s). The output of the cross-correlation process may include a time associated with a cross-correlation value.

In some embodiments, process 1300 may include determining statistical values for time window(s) in the portion of the first data and the portion of the second data, and using a combination of statistical value(s) for the portion of the first data and statistical value(s) for the portion of the second data as input to the trained statistical model(s). The time window(s) may be selected in the first data and the second data based on diurnal occupancy patterns in the building. Some embodiments may involve determining a difference between the statistical value(s) for the portion of the first data and the statistical value(s) for the portion of the second data, and using the difference as input to the trained statistical model(s). Statistical value(s) may include one or more of a minimum value, a maximum value, a mean value, a median value, a standard deviation value, $5^{th}$ percentile value, $25^{th}$ percentile value, $33^{rd}$ percentile value, $66^{th}$ percentile value, $75^{th}$ percentile value, and $95^{th}$ percentile value.

Figure 14:
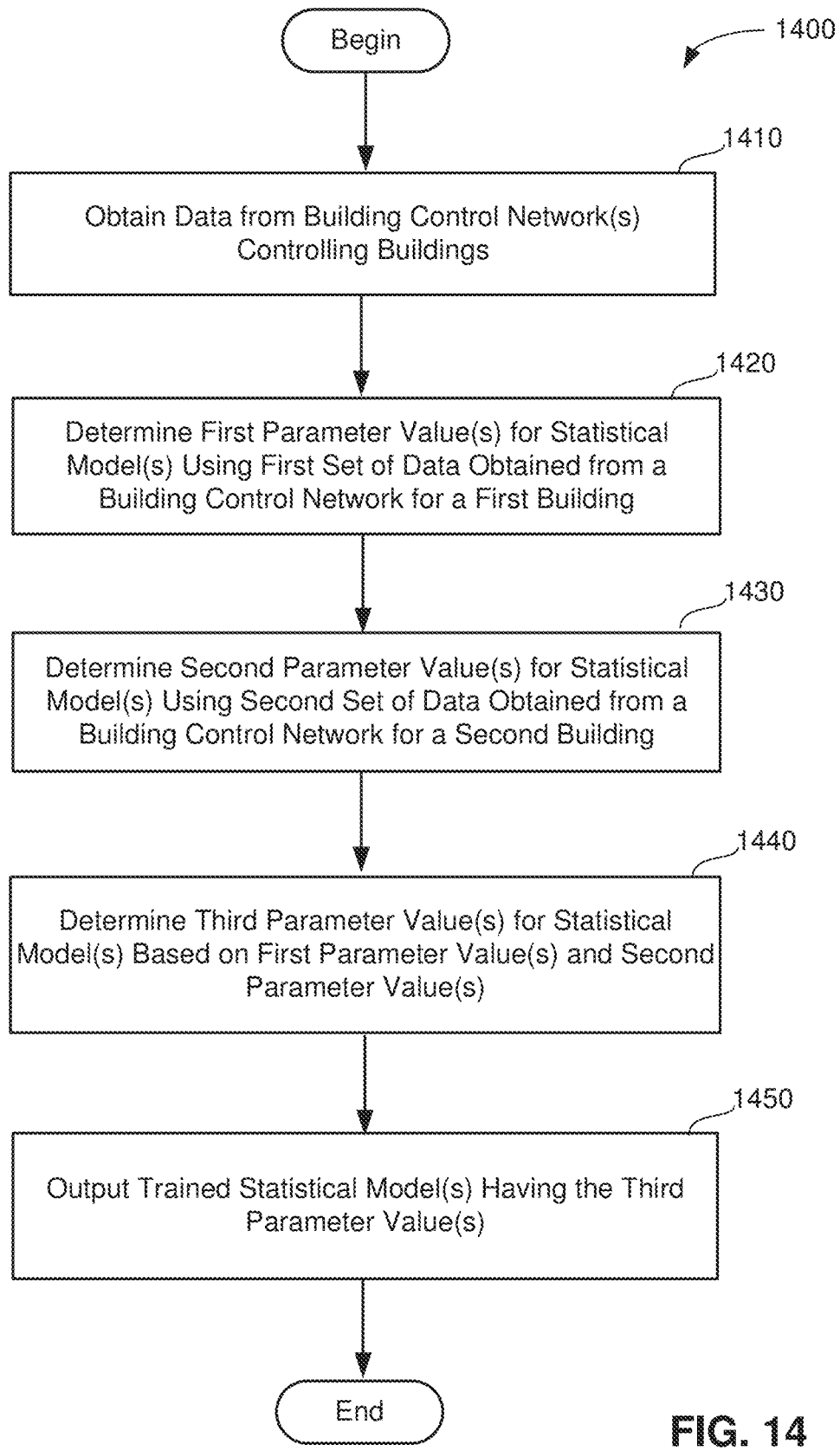
FIG. 14 is a flow chart of an illustrative process for determining parameter value(s) for trained statistical model(s), in accordance with some embodiments of the technology described herein.

FIG. 14 is a flow chart of an illustrative process 1400 for determining parameter value(s) for trained statistical model(s), in accordance with some embodiments of the technology described herein. Process 1400 may be performed on any suitable computing device(s) (e.g., a single computing device, multiple computing devices co-located in a single physical location or located in multiple physical locations remote from one another, one or more computing devices part of a cloud computing system, etc.), as aspects of the technology described herein are not limited in this respect.

Process 1400 begins at act 1410, where data from building control networks controlling multiple buildings is obtained. The data may include a first set of data obtained from a building control network for a first building and a second set of data obtained from a building control network for a second building. Next, process 1400 proceeds to act 1420, where first parameter value(s) are determined for statistical model(s) using the first set of data and the statistical model(s). Next, process 1400 proceeds to act 1430, where second parameter value(s) are determined for the statistical model(s) using the second set of data and the statistical model(s). Next process 1400 proceeds to act 1440, where third parameter value(s) are determined for the statistical model(s) based on the first parameter value(s) and the second parameter value(s).

Next process 1400 proceeds to act 1450, where trained statistical model(s) having the third parameter value(s) is output. The trained statistical model(s) may include a first statistical model used for determining point type(s) for data obtained from a building control network. The trained statistical model(s) may include a second statistical model used for determining equipment type(s) for data obtained from a building control network. The trained statistical model(s) may include one or more of a support vector machine classifier, a logistic regression classifier, a gradient boosted classifier, a decision tree classifier, a Bayesian classifier, a Bayesian network classifier, and a random forest classifier. In some embodiments, the trained statistical model(s) may include one or more neural networks.

In some embodiments, process 1400 may involve determining label(s) for a third set of data obtained from a building control network controlling a third building using the third parameter value(s) and the trained statistical model(s). The label(s) may include one or more of point type and equipment type. Example point types include a sensor, an actuator, a setpoint, and an alarm. Examples of equipment types include an air handling unit, a variable-air-volume box, a boiler, a chiller, a fan, a filter, and a thermostat. In some embodiments, the label(s) may include a first label identifying a point type for a point in the building control network and a second label identifying an equipment type for the point in the building control network.

In some embodiments, the trained statistical model(s) may include a first statistical model and a second statistical model. Determining the label(s) for the third set of data may include determining a point type using the first statistical model and determining an equipment type using the second statistical model.

In some embodiments, process 1400 may include training the statistical model(s) using feature(s) determined from a natural language dictionary of building control network terms to obtain the trained statistical model(s). The building control network terms may be associated with different suppliers of equipment.

Figure 15:
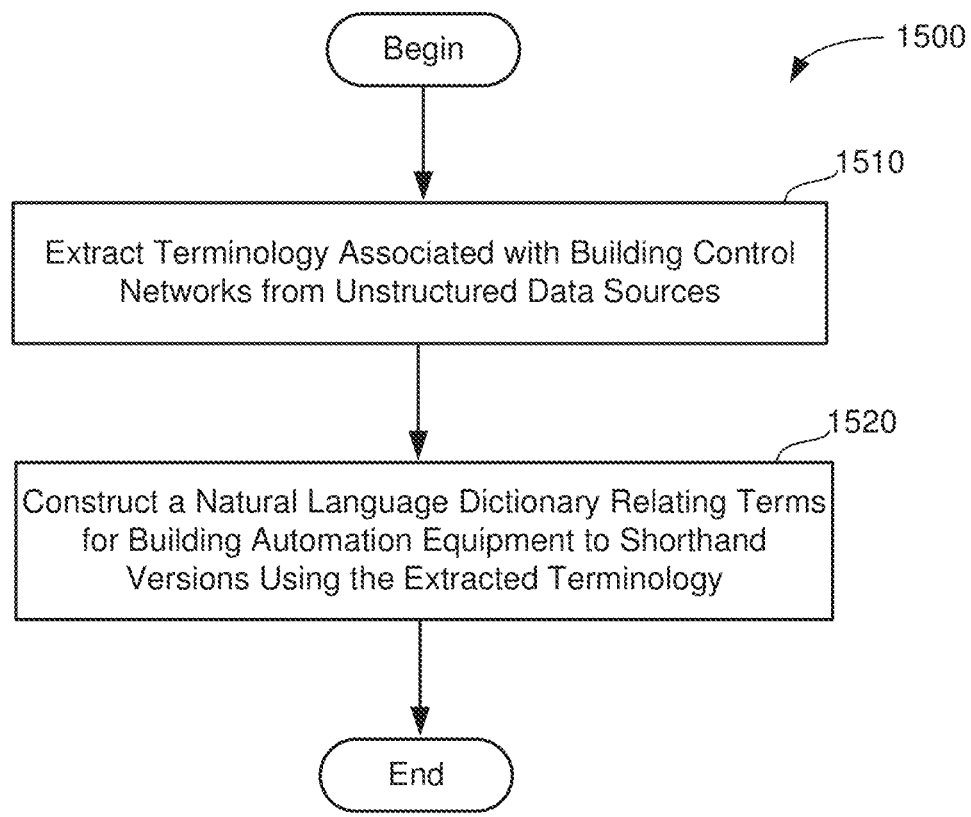
FIG. 15 is a flow chart of an illustrative process for constructing a natural language dictionary relating terms for building automation equipment to shorthand versions of the terms, in accordance with some embodiments of the technology described herein.

FIG. 15 is a flow chart of an illustrative process 1500 for constructing a natural language dictionary relating terms for building automation equipment to shorthand versions of the terms, in accordance with some embodiments of the technology described herein. Process 1500 may be performed on any suitable computing device(s) (e.g., a single computing device, multiple computing devices co-located in a single physical location or located in multiple physical locations remote from one another, one or more computing devices part of a cloud computing system, etc.), as aspects of the technology described herein are not limited in this respect.

Process 1500 begins at act 1510, where terminology associated with building control networks is extracted from unstructured data sources. The unstructured data sources may include data sources from different suppliers of building automation equipment. In some embodiments, the unstructured data sources may include webpages associated with one or more of the different supplies. In such embodiments, extracting the terminology may include using a web scraping process.

Next, process 1500 proceeds to act 1520, where a natural language dictionary using the extracted terminology is constructed. The natural language dictionary relates terms for different types of building automation equipment to shorthand versions of the terms.

In some embodiments, the shorthand versions of the terms may include one or more acronyms. In such embodiments, process 1500 may include determining two or more acronyms associated with one or more of the terms.

In some embodiments, process 1500 may include determining feature(s) of the terms included in the natural language dictionary and using the feature(s) to train statistical model(s), such as statistical model(s) 114. Determining the feature(s) of the terms may include determining one or more term frequency-inverse document frequency values associated with individual terms in the natural language dictionary. The statistical model(s) may include one or more of a support vector machine classifier, a logistic regression classifier, a gradient boosted classifier, a decision tree classifier, a Bayesian classifier, a Bayesian network classifier, and a random forest classifier. In some embodiments, the statistical model(s) may include one or more neural networks.

Figure 16:
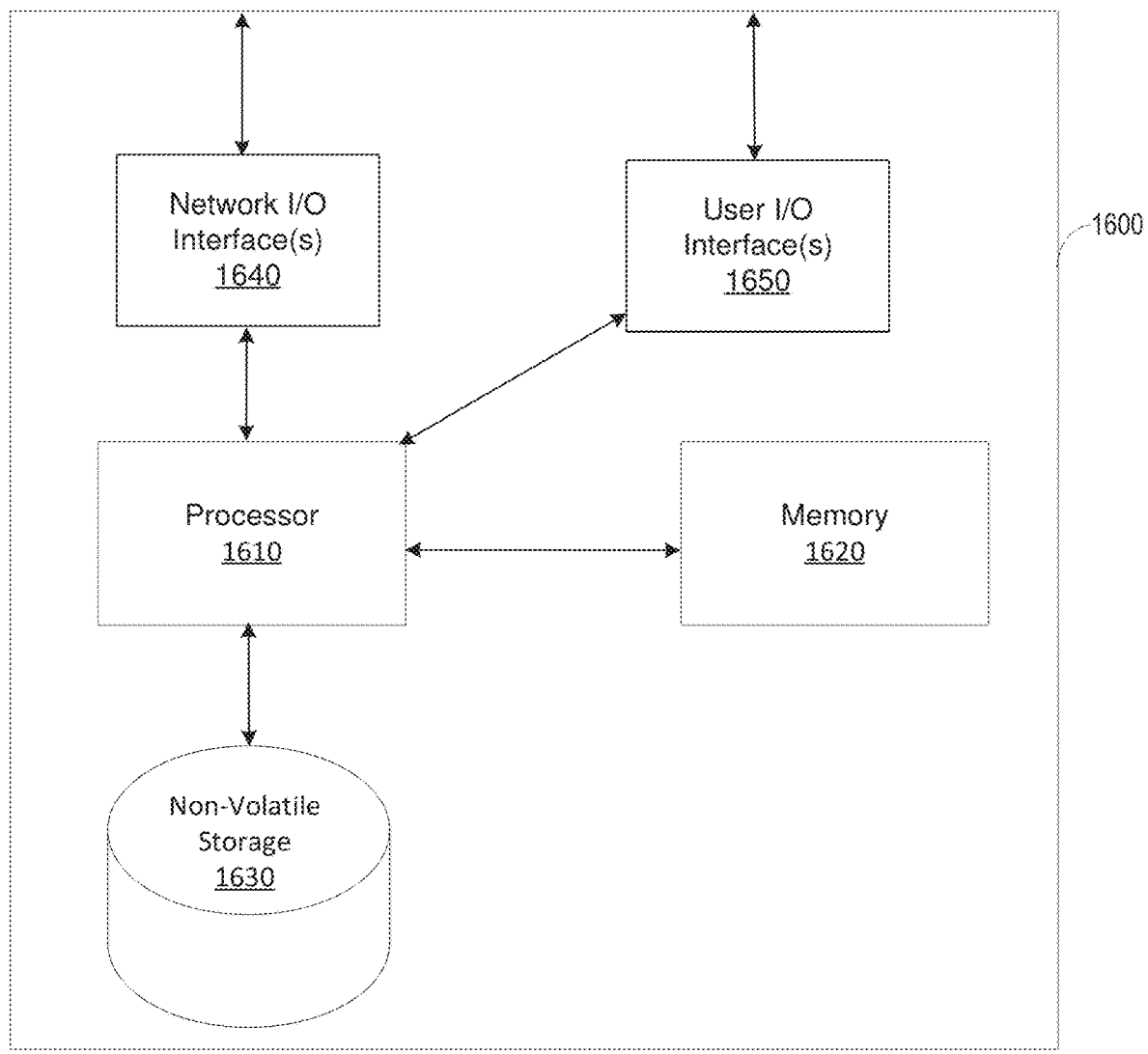
FIG. 16 is a block diagram of an illustrative computer system that may be used in implementing some embodiments of the technology described herein.

An illustrative implementation of a computer system 1600 that may be used in connection with any of the embodiments of the technology described herein is shown in FIG. 16. The computer system 1600 includes one or more processors 1610 and one or more articles of manufacture that comprise non-transitory computer-readable storage media (e.g., memory 1620 and one or more non-volatile storage media 1630). The processor 1610 may control writing data to and reading data from the memory 1620 and the non-volatile storage device 1630 in any suitable manner, as the aspects of the technology described herein are not limited in this respect. To perform any of the functionality described herein, the processor 1610 may execute one or more processor-executable instructions stored in one or more non-transitory computer-readable storage media (e.g., the memory 1620), which may serve as non-transitory computer-readable storage media storing processor-executable instructions for execution by the processor 1610.

Computing device 1600 may also include a network input/output (I/O) interface 1640 via which the computing device may communicate with other computing devices (e.g., over a network), and may also include one or more user I/O interfaces 1650, via which the computing device may provide output to and receive input from a user. The user I/O interfaces may include devices such as a keyboard, a mouse, a microphone, a display device (e.g., a monitor or touch screen), speakers, a camera, and/or various other types of I/O devices.

The embodiments described herein can be implemented in any of numerous ways. For example, the embodiments may be implemented using hardware, software or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (i.e., a plurality of executable instructions) that, when executed on one or more processors, performs the above-discussed functions of one or more embodiments. The computer-readable medium may be transportable such that the program stored thereon can be loaded onto any computing device to implement aspects of the techniques discussed herein. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

The invention claimed is:

1. A computer-implemented method, comprising:
using at least one hardware processor to perform:
obtaining first data for a first piece of equipment located at a building controlled by a building control network, the first data including time series data corresponding to one or more first measurement points associated with the first piece of equipment;
determining, using the first data and at least one statistical model trained using training data indicating a plurality of measurement point types and a plurality of equipment types for different pieces of equipment, at least one measurement point type for the one or more first measurement points,
wherein the at least one statistical model includes an encoder, and determining the at least one measurement point type for the one or more first measurement points further comprises determining, using the encoder and the first data, at least one feature of the first data, wherein the at least one feature of the first data includes a ratio of consecutive data values in the first data that are substantially similar to a total number of data values in the first data; and
monitoring operation of equipment in the building based, at least in part, on the at least one measurement point type determined for the one or more first measurement points, wherein monitoring operation of equipment in the building comprises:
identifying, based at least in part on data values associated with a first measurement point of the one or more first measurement points and the measurement point type determined for the first measurement point, one or more pieces of equipment in the building is in need of service; and
outputting a recommendation to calibrate or replace the first piece of equipment and/or a second piece of equipment having an operational relationship with the first piece of equipment in response to determining one or more pieces of equipment in the building is in need of service.

2. The method of claim 1, further comprising:
obtaining second data for a second piece of equipment located at the building, the second data including time series data corresponding to one or more second measurement points associated with the second piece of equipment; and
determining, using the second data and the at least one statistical model, at least one measurement point type for the one or more second measurement points and an equipment type for the second piece of equipment.

3. The method of claim 1, wherein the at least one measurement point type includes one or more measurement point types selected from the group consisting of: a sensor, an actuator, a setpoint, and an alarm.

4. The method of claim 1, wherein the method further comprises determining, using the first data and the at least one statistical model, an equipment type for the first piece of equipment.

5. The method of claim 4, wherein the equipment type is selected from the group consisting of: an air handling unit, a variable-air-volume box, a boiler, a chiller, a fan, a filter, and a thermostat.

6. The method of claim 1, wherein determining the at least one measurement point type for the one or more first measurement points further comprises providing the first data as an input to the encoder and obtaining an output indicating the at least one feature.

7. The method of claim 1, wherein the at least one feature of the first data includes at least one selected from the group consisting of: a mean value for the first data, a median value for the first data, a standard deviation value for the first data, a kurtosis value for the first data, a skewness value for the first data, a minimum value for the first data, a maximum value for the first data, a median absolute deviation value for the first data, a mean absolute deviation value for the first data, and an interquartile range value for the first data, an autocorrelation value for the first data.

8. The method of claim 1, wherein the first data corresponds to one measurement point associated with the first piece of equipment, and the at least one feature of the first data includes a correlation value between the first data and second data corresponding to another measurement point of the first piece of equipment.

9. The method of claim 1, wherein the at least one feature of the first data includes a percentage of data values in the first data containing a decimal point.

10. The method of claim 1, wherein the at least one feature of the first data includes a correlation value between the time series data of the first data and outdoor temperature for a location of the building.

11. The method of claim 1, wherein the at least one feature of the first data includes at least one amplitude of one or more Fourier harmonics of the first data.

12. The method of claim 1, wherein the at least one feature of the first data includes at least frequency corresponding to one or more Fourier harmonics of the first data.

13. The method of claim 1, wherein the at least one statistical model includes at least one classifier, and determining the at least one measurement point type for the one or more first measurement points further comprises determining, using the at least one classifier and the at least one feature, the at least one measurement point type for the one or more first measurement points.

14. The method of claim 13, wherein determining the at least one measurement point type for the one or more first measurements points further comprises providing the at least one feature as an input to the at least one classifier and obtaining an output indicating the at least one measurement point type.

15. The method of claim 14, wherein the output includes values corresponding to a plurality of measurement point types, and wherein determining the at least one measurement point type further comprises selecting, based on the values corresponding to the plurality of measurement point types, the at least one measurement point type for the one or more first measurement points from among the plurality of measurement point types.

16. The method of claim 14, wherein the output includes values corresponding to a plurality of equipment types, and the method further comprises determining an equipment type for the first piece of equipment at least in part by selecting, based on the values corresponding to the plurality of equipment types, the equipment type for the first piece of equipment from among the plurality of equipment types.

17. The method of claim 13, wherein the at least one classifier comprises one or more classifiers selected from the group consisting of: a support vector machine classifier, a logistic regression classifier, a gradient boosted classifier, a decision tree classifier, a Bayesian classifier, a Bayesian network classifier, a random forest classifier, a k-nearest neighbors classifier, a neural network classifier, and an extremely randomized trees classifier.

18. The method of claim 1, wherein determining the at least one measurement point type for the one or more first measurement points further comprises providing the first data as an input to the at least one statistical model and obtaining an output indicating the at least one measurement point type as an output.

19. The method of claim 18, wherein the at least one statistical model comprises at least one neural network.

20. The method of claim 19, wherein the at least one neural network comprises a 1-dimensional convolutional neural network.

21. The method of claim 19, further comprising:
performing a normalization process on the first data to obtain normalized first data,
wherein determining the at least one measurement point type for the one or more first measurement points further comprises:
providing the normalized first data as an input to the at least one neural network; and
obtaining an output indicating the at least one measurement point type and the equipment type as an output.

22. The method of claim 19, further comprising:
training the at least one neural network using the training data,
wherein training the at least one neural network further comprises performing layer normalization.

23. The method of claim 19, further comprising:
applying a multidimensional transformation process to the first data to obtain transformed first data,
wherein determining the at least one measurement point type for the one or more first measurement points further comprises:
providing the transformed first data as an input to the at least one neural network; and
obtaining an output indicating the at least one measurement point type as an output.

24. The method of claim 23, wherein the transformed first data includes a multidimensional matrix.

25. The method of claim 23, wherein the multidimensional transformation process is a geometrical transformation process.

26. The method of claim 23, wherein the multidimensional transformation process is a probabilistic transformation process.

27. The method of claim 1, further comprising:
determining, based, at least in part, on the at least one measurement point type for the one or more first measurement points that the second piece of equipment has the operational relationship with the first piece of equipment.

28. A computer-implemented method, comprising:
using at least one hardware processor to perform:
obtaining first data for a first piece of equipment located at a building controlled by a building control network, the first data including time series data corresponding to one or more first measurement points associated with the first piece of equipment;
determining, using the first data and at least one statistical model trained using training data indicating a plurality of measurement point types and a plurality of equipment types for different pieces of equipment, at least one measurement point type for the one or more first measurement points, wherein the first data further comprises text data corresponding to the one or more first measurement points associated with the first piece of equipment, and the at least one statistical model further comprises a first statistical model and a second statistical model;
providing the time series data as an input to the first statistical model to obtain a first output;
providing the text data as an input to the second statistical model to obtain a second output,
wherein determining the at least one measurement point type for the one or more first measurement points comprises determining, using the first output and the second output, the at least one measurement point type for the one or more first measurement points; and
monitoring operation of equipment in the building based, at least in part, on the at least one measurement point type determined for the one or more first measurement points, wherein monitoring operation of equipment in the building comprises:
identifying, based at least in part on data values associated with a first measurement point of the one or more first measurement points and the measurement point type determined for the first measurement point, one or more pieces of equipment in the building is in need of service; and
outputting a recommendation to calibrate or replace the first piece of equipment and/or a second piece of equipment having an operational relationship with the first piece of equipment in response to determining one or more pieces of equipment in the building is in need of service.

29. The method of claim 28, wherein the at least one statistical model further comprises a third statistical model, and determining the at least one measurement point type for the one or more first measurement points further comprises providing the first output and the second output as inputs to the third statistical model to obtain an output indicating the at least one measurement point type.

30. A system comprising:
at least one hardware processor; and
at least one non-transitory computer-readable storage medium storing processor-executable instructions that, when executed by the at least one hardware processor, cause the at least one hardware processor to:
obtain first data for a first piece of equipment located at a building controlled by a building control network, the first data including time series data corresponding to one or more first measurement points associated with the first piece of equipment;
determine, using the first data and at least one statistical model trained using training data indicating a plurality of measurement point types and a plurality of equipment types for different pieces of equipment, at least one measurement point type for the one or more first measurement points,
wherein the at least one statistical model includes an encoder, and determining the at least one measurement point type for the one or more first measurement points further comprises determining, using the encoder and the first data, at least one feature of the first data, wherein the at least one feature of the first data includes a ratio of consecutive data values in the first data that are substantially similar to a total number of data values in the first data; and
monitor operation of equipment in the building based, at least in part, on the at least one measurement point type determined for the one or more first measurement points, wherein monitoring operation of equipment in the building comprises:
identifying, based at least in part on data values associated with a first measurement point of the one or more first measurement points and the measurement point type determined for the first measurement point, one or more pieces of equipment in the building is in need of service; and
outputting a recommendation to calibrate or replace the first piece of equipment and/or a second piece of equipment having an operational relationship with the first piece of equipment in response to determining one or more pieces of equipment in the building is in need of service.

31. At least one non-transitory computer-readable storage medium storing processor-executable instructions that, when executed by at least one hardware processor, cause the at least one hardware processor to:
obtain first data for a first piece of equipment located at a building controlled by a building control network, the first data including time series data corresponding to one or more first measurement points associated with the first piece of equipment;
determine, using the first data and at least one statistical model trained using training data indicating a plurality of measurement point types and a plurality of equipment types for different pieces of equipment, at least one measurement point type for the one or more first measurement points, wherein the first data further comprises text data corresponding to the one or more first measurement points associated with the first piece of equipment, and the at least one statistical model further comprises a first statistical model and a second statistical model;
provide the time series data as an input to the first statistical model to obtain a first output;
provide the text data as an input to the second statistical model to obtain a second output, wherein determining the at least one measurement point type for the one or more first measurement points comprises determining, using the first output and the second output, the at least one measurement point type for the one or more first measurement points; and
monitor operation of equipment in the building based, at least in part, on the at least one measurement point type determined for the one or more first measurement points, wherein monitoring operation of equipment in the building comprises:
identifying, based at least in part on data values associated with a first measurement point of the one or more first measurement points and the measurement point type determined for the first measurement point, one or more pieces of equipment in the building is in need of service; and
outputting a recommendation to calibrate or replace the first piece of equipment and/or a second piece of equipment having an operational relationship with the first piece of equipment in response to determining one or more pieces of equipment in the building is in need of service.

* * * * *